US012725011B2

(12) United States Patent
Stokes, III et al.

(10) Patent No.: US 12,725,011 B2
(45) Date of Patent: Sep. 1, 2026

(54) BAYESIAN NEURAL NETWORKS FOR RANSOMWARE INCIDENT DETECTION

(71) Applicant: MICROSOFT TECHNOLOGY LICENSING, LLC, Redmond, WA (US)

(72) Inventors: Jack Wilson Stokes, III, North Bend, WA (US); Jurijs Nazarovs, Madison, WI (US); Melissa Turcotte, Santa Fe, NM (US); Justin Carroll, Kirkland, WA (US); Itai Grady Ashkenazy, Ramat Hasharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1054 days.

(21) Appl. No.: 17/720,294

(22) Filed: Apr. 14, 2022

(65) Prior Publication Data

US 2023/0244916 A1 Aug. 3, 2023

Related U.S. Application Data

(60) Provisional application No. 63/305,249, filed on Jan. 31, 2022.

(51) Int. Cl.
*G06N 3/047* (2023.01)
*G06F 3/08* (2006.01)
(Continued)

(52) U.S. Cl.
CPC ........... *G06N 3/047* (2023.01); *G06F 21/561* (2013.01); *G06N 3/08* (2013.01)

(58) Field of Classification Search
None
See application file for complete search history.

(56) References Cited

U.S. PATENT DOCUMENTS 7,265,353 B2 * 9/2007 Evans ........................ G01T 1/17
11,277,423 B2 * 3/2022 Brown ................ H04L 63/1425
(Continued)

FOREIGN PATENT DOCUMENTS

EP 3043535 A1 7/2016

OTHER PUBLICATIONS

Of Farquhar et al., "Radial bayesian neural networks: Beyond discrete support in large-scale bayesian deep learning.", (May 31, 2021) (Year: 2021).*
(Continued)

*Primary Examiner* — Michelle T Bechtold
*Assistant Examiner* — Matiyas T Maru
(74) *Attorney, Agent, or Firm* — David Foster; Newport IP, LLC

(57) ABSTRACT

The techniques disclosed herein identify ransomware attacks as they are occurring, improving the security and functionality of computer systems. Ransomware attacks are identified using a new probabilistic machine learning model that better handles the unique properties of ransomware data. Ransomware data includes a list of computing operations, some of which are labeled as being associated with ransomware attacks. In contrast to deterministic machine learning techniques that learn weights, probabilistic machine learning techniques learn the parameters of a distribution function. In some configurations, a radial Spike and Slab distribution function is used within a Bayesian neural network framework to better handle sparse, missing, and imbalanced data. Once trained, the machine learning model may be provided with real-time operations, e.g., from a cloud service security module, from which to infer whether a ransomware attack is taking place.

19 Claims, 13 Drawing Sheets

(51) Int. Cl.
*G06F 21/56* (2013.01)
*G06N 3/08* (2023.01)

(56) References Cited

U.S. PATENT DOCUMENTS

| | | | | |
|---|---|---|---|---|
| 2012/0069980 | A1* | 3/2012 | Wall | H04L 9/40 |
| 2016/0212099 | A1 | 7/2016 | Wang et al. | |
| 2018/0212987 | A1 | 7/2018 | Tamir et al. | |
| 2019/0251259 | A1 | 8/2019 | Stepanek et al. | |
| 2019/0303573 | A1* | 10/2019 | Chelarescu | H04L 63/1416 |
| 2021/0037035 | A1* | 2/2021 | Graul | G06F 21/552 |
| 2021/0103807 | A1* | 4/2021 | Baker | G16H 50/20 |

OTHER PUBLICATIONS

Polson et al., "Posterior concentration for sparse deep learning." (Year: 2018).*
Oh, et al., "Radial and directional posteriors for bayesian neural networks." (Year: 2019).*
Malsiner-Walli et al., "Comparing spike and slab priors for Bayesian variable selection." (Year: 2018).*
Farquhar et al., "Radial bayesian neural networks: Beyond discrete support in large-scale bayesian deep learning." (2021). (Year: 2021).*
Zhang, et al., "Classification of Ransomware Families with Machine Learning Based on N-Gram of Opcodes", In Journal of Future Generation Computer Systems, vol. 90, Jan. 1, 2019, pp. 211-221.
Alhawi, et al., "Leveraging Machine Learning Techniques for Windows Ransomware Network Traffic Detection", In Proceedings of Cyber Threat Intelligence, Apr. 24, 2018, 11 Pages.
Babacan, et al., "Bayesian Compressive Sensing Using Laplace Priors", In Journal of IEEE Transactions on Image Processing, vol. 19, Issue 1, Jan. 2010, pp. 53-63.
Bai, et al., "Efficient Variational Inference for Sparse Deep Learning with Theoretical Guarantee", In Repository of arXiv:2011.07439v1, Nov. 15, 2020, 23 Pages.
Basnet, et al., "Ransomware Detection Using Deep Learning in the SCADA System of Electric Vehicle Charging Station", In Repository of arXiv:2104.07409v1, Apr. 15, 2021, 5 Pages.
Batista, et al., "A Study of K-Nearest Neighbour as an Imputation Method", In Proceedings of HIS, 2003, 10 Pages.
Bhattacharya, et al., "Dirichlet-Laplace Priors for Optimal Shrinkage", In Journal of the American Statistical Association, vol. 110, No. 512, Dec. 1, 2015, 27 Pages.
Blundell, et al., "Weight Uncertainty in Neural Networks", In Repository of arXiv:1505.05424v2, May 21, 2015, 10 Pages.
Buuren, et al., "mice: Multivariate Imputation by Chained Equations in R", In Journal of Statistical Software, vol. 45, Issue 3, Dec. 12, 2011, pp. 1-67.
Carvalho, et al., "Handling Sparsity via the Horseshoe", In Proceedings of the 12th International Conference on Artificial Intelligence and Statistics, vol. 5, Apr. 16, 2009, pp. 73-80.
Chen, et al., "Neural Ordinary Differential Equations", In Proceedings of the 32nd Conference on Neural Information Processing Systems, Dec. 3, 2018, 18 Pages.
Cho, et al., "Learning Phrase Representations using RNN Encoder-Decoder for Statistical Machine Translation", In Repository of arXiv:1406.1078v3, Sep. 3, 2014, 15 Pages.
De'Ath, et al., "Classification and Regression Trees: A Powerful Yet Simple Technique for Ecological Data Analysis", In Journal of Ecology, vol. 81, No. 11, Nov. 1, 2000, pp. 3178-3192.
Egunjobi, et al., "Classifying Ransomware Using Machine Learning Algorithms", In Proceedings of International Conference on Intelligent Data Engineering and Automated Learning, Nov. 14, 2019, 8 Pages.
Farquhar, et al., "Radial Bayesian Neural Networks: Beyond Discrete Support In Large-Scale Bayesian Deep Learning", In Proceedings of the Twenty Third International Conference on Artificial Intelligence and Statistics (AISTATS), Aug. 26, 2020, 10 Pages.
Fortuin, et al., "Bayesian Neural Network Priors Revisited", In Proceedings of 1st I Can't Believe It's Not Better Workshop (ICBINB), NeurIPS, Dec. 12, 2020, 17 Pages.
Friedman, et al., "Challenge: What is the Impact of Bayesian Networks on Learning?", In Proceedings of the 15th international joint conference on Artifical intelligence, vol. 97, Jan. 1997, pp. 10-15.
George, et al., "Approaches for Bayesian Variable Selection", In Journal of Statistica Sinica, vol. 7, No. 2, Apr. 1997, pp. 339-373.
Ghosh, et al., "Model selection in Bayesian neural networks via horseshoe priors", In Repository of arXiv:1705.10388, May 29, 2017, 15 Pages.
Sprangers, et al., "Probabilistic Gradient Boosting Machines for Large-Scale Probabilistic Regression", In Proceedings of the 27th ACM SIGKDD Conference on Knowledge Discovery & Data Mining, Aug. 14, 2021, pp. 1510-1520.
Graves, Alex, "Practical Variational Inference for Neural Networks", In Proceedings of Advances in Neural Information Processing Systems (NIPS), vol. 24, Dec. 12, 2011, 9 Pages.
Hartigan, et al., "Algorithm AS 136: A K-Means Clustering Algorithm", In Journal of the Royal Statistical Society, Series C (Applied Statistics), vol. 28, No. 1, Jan. 1, 1979, pp. 100-108.
Heckerman, David, "Bayesian Networks for Data Mining", In Journal of Data Mining and Knowledge Discovery, vol. 1, Mar. 1997, pp. 79-119.
Huang, et al., "Bidirectional LSTM-CRF Models for Sequence Tagging", In Repository of arXiv:1508.01991v1, Aug. 9, 2015, 10 Pages.
Jacob, et al., "Group Lasso with Overlap and Graph Lasso", In Proceedings of the 26th Annual International Conference on Machine Learning, Jun. 14, 2009, pp. 433-440.
Jang, et al., "Categorical Reparameterization with Gumbel-Softmax", In Repository of arXiv:1611.01144v2, Nov. 22, 2016, 12 Pages.
Kang, Hyun, "The Prevention and Handling of the Missing Data", In Korean Journal of Anesthesiology, vol. 64, Issue 5, May 24, 2013, pp. 402-406.
Kingma, et al., "Adam: A Method for Stochastic Optimization", In Repository of arXiv:1412.6980v1, Dec. 22, 2014, 9 Pages.
Kingma, et al., "Auto-Encoding Variational Bayes", In Repository of arXiv:1312.6114v4, Dec. 27, 2013, 14 Pages.
Kingma, et al., "Variational Dropout and the Local Reparameterization Trick", In Proceedings of Advances in Neural Information Processing Systems (NIPS), vol. 28, Dec. 7, 2015, 9 Pages.
Kok, et al., "Ransomware, Threat and Detection Techniques: A Review", In International Journal of Computer Science and Network Security (IJCSNS), vol. 19, No. 2, Feb. 5, 2019, pp. 136-146.
Krishnan, et al., "Efficient Priors for Scalable Variational Inference in Bayesian Deep Neural Networks", In Proceedings of the IEEE/CVF International Conference on Computer Vision (ICCV), Oct. 27, 2019, 5 Pages.
Kshetri, et al., "Do Crypto-Currencies Fuel Ransomware?", In Journal of IT Professional, vol. 19, No. 5, Oct. 4, 2017, 7 Pages.
Lakshminarayan, et al., "Imputation of Missing Data in Industrial Databases", In Journal of Applied Intelligence, vol. 11, No. 3, Nov. 1999, pp. 259-275.
Larsen, et al., "A Survey of Machine Learning Algorithms for Detecting Ransomware Encryption Activity", In Repository of arXiv:2110.07636v1, Oct. 14, 2021, 9 Pages.
Liu, et al., "Model-Free Data Authentication for Cyber Security in Power Systems", In Journal of IEEE Transactions on Smart Grid, vol. 11, No. 5, Sep. 2020, 4 Pages.
Śmieja, et al., "Processing of Missing Data by Neural Networks", In Proceedings of Advances in Neural Information Processing Systems (NeurIPS), vol. 31, Dec. 3, 2018, 11 Pages.
Maddison, et al., "The Concrete Distribution: A Continuous Relaxation of Discrete Random Variables", In Repository of arXiv:1611.00712v2, Nov. 6, 2016, 17 Pages.
Mcgregor, et al., "Stabilising Priors for Robust Bayesian Deep Learning", In Repository of arXiv:1910.10386v1, Oct. 23, 2019, 12 Pages.

(56) References Cited

OTHER PUBLICATIONS

Meier, et al., "The Group Lasso for Logistic Regression", In Journal of the Royal Statistical Society: Series B (Statistical Methodology), vol. 70, No. 1, Feb. 2008, pp. 53-71.
Simon, et al., "A Sparse-Group Lasso", In Journal of Computational and Graphical Statistics, vol. 22, No. 2, May 30, 2013, 19 Pages.
Miller, et al., "Reducing Reparameterization Gradient Variance", In Proceedings of Advances in Neural Information Processing Systems (NIPS), vol. 30, Dec. 4, 2017, 11 Pages.
Mitchell, et al., "Bayesian Variable Selection in Linear Regression", In Journal of the American Statistical Association, vol. 83, No. 404, Dec. 1, 1988, pp. 1023-1032.
Moore, et al., "Gartner Forecasts Worldwide Information Security Spending to Exceed $124 Billion in 2019", Retrieved From: https://www.gartner.com/en/newsroom/press-releases/2018-08-15-gartner-forecasts-worldwide-information-security-spending-to-exceed-124-billion-in-2019, Aug. 15, 2018, 3 Pages.
Morgan, Steve, "2019 Official Annual Cybercrime Report", Retrieved From: https://cybernetsecurity.com/industry-papers/CV-HG-2019-Official-Annual-Cybercrime-Report.pdf, 2019, 12 Pages.
Morgan, Steve, "Top 5 Cybersecurity Facts, Figures, Predictions, And Statistics For 2020 To 2021", Retrieved From: https://cybersecurityventures.com/top-5-cybersecurity-facts-figures-predictions-and-statistics-for-2019-to-2021/, Mar. 29, 2020, 7 Pages.
Nazarovs, et al., "Graph Reparameterizations for Enabling 1000+ Monte Carlo Iterations in Bayesian Deep Neural Networks", In Proceedings of the Thirty-Seventh Conference on Uncertainty in Artificial Intelligence, PMLR, Jul. 27, 2021, pp. 118-128.
Oyen, et al., "Bayesian Networks with Prior Knowledge for Malware Phylogenetics", In Proceedings of Workshops at the Thirtieth AAAI Conference on Artificial Intelligence, Feb. 12, 2016, pp. 185-192.
Paisley, et al., "Variational Bayesian Inference with Stochastic Search", In Repository of arXiv:1206.6430v1, Jun. 27, 2012, 8 Pages.
Perusquía, et al., "Bayesian Models Applied to Cyber Security Anomaly Detection Problems", In Repository of arXiv:2003.10360v2, May 19, 2020, 40 Pages.
Poudyal, et al., "A Framework for Analyzing Ransomware using Machine Learning", In Proceedings of IEEE Symposium Series on Computational Intelligence (SSCI), Nov. 18, 2018, 8 Pages.
Promyslov, et al., "A Clustering Method of Asset Cybersecurity Classification", In Proceedings of IFAC-PapersOnLine, vol. 52, No. 13, Aug. 28, 2019, pp. 928-933.
Zhao, et al., "A Review of Computer Vision Methods in Network Security", In Journal of IEEE Communications Surveys & Tutorials, vol. 23, Issue 3, Jun. 4, 2021, pp. 1838-1878.
Ranganath, et al., "Black Box Variational Inference", In Proceedings of the Seventeenth International Conference on Artificial Intelligence and Statistics, Apr. 22, 2014, pp. 814-822.
Rubanova, et al., "Latent Ordinary Differential Equations for Irregularly-Sampled Time Series", In Proceedings of Advances in Neural Information Processing Systems (NeurIPS), vol. 32, Dec. 8, 2019, 11 Pages.
Ruck, et al., "The Multilayer Perceptron as an Approximation to a Bayes Optimal Discriminant Function", In Journal of IEEE Transactions on Neural Networks, vol. 1, No. 4, Dec. 1990, pp. 296-298.
Sharpe, et al., "Dealing with Missing Values in Neural Network-Based Diagnostic Systems", In proceedings of Neural Computing & Applications, vol. 3, No. 2, Jun. 1995, 16 Pages.
Shin, et al., "Development of a cyber security risk model using Bayesian networks", In Journal of Reliability Engineering & System Safety, vol. 134, Feb. 2015.
Menard, Scott, "Applied Logistic Regression Analysis", In Publication of Sage, 2002.
Lütkepohl, Helmut, "Comparison of Criteria for Estimating the Order of a Vector Autoregressive Process", In Journal of Time Series Analysis, vol. 6, No. 1, Jan. 1, 1985.
Glymour, Clarkn. , "The Mind's Arrows: Bayes Nets and Graphical Causal Models in Psychology", In Publication of the MIT Press, Nov. 2001.
"Ransomware Rise Calls for Stronger Cyber Resilience", In Proceedings of Emerald Expert Briefings oxan-db, Apr. 3, 2020.
"International Search Report and Written Opinion Issued in PCT Application No. PCT/US23/010255", Mailed Date: Apr. 5, 2023, 14 Pages.
Sgandurra, et al., "Automated Dynamic Analysis of Ransomware: Benefits, Limitations and Use for Detection", In repository of arXiv:1609.03020v1, Sep. 10, 2016, 12 Pages.
Walli, et al., "Comparing Spike and Slab Priors for Bayesian Variable Selection", In repository of arXiv:1812.07259v1, Dec. 18, 2018, 23 Pages.

* cited by examiner

BAYESIAN NEURAL NETWORKS FOR RANSOMWARE INCIDENT DETECTION

PRIORITY APPLICATION

This application claims the benefit of and priority to U.S. Provisional Application No. 63/305,249, filed Jan. 31, 2022, the entire contents of which are incorporated herein by reference.

BACKGROUND

Digital devices are often used to store sensitive and valuable data. With the advent of cloud services this data is increasingly being stored in a single location. One benefit of centralized storage is convenient access to all of one's data from multiple devices and different networks. However, storing all of one's data in a single location makes a ransomware attack more desirable.

Ransomware is a type of malware that threatens to publish the victim's personal data or blocks access to their data. For example, a ransomware attacker may gain access to the victim's data, encrypt a copy of it, and then delete the original data. Once encrypted, the victim's data is unusable until the decryption key is obtained. Ransomware gangs will then extort the victim for large sums of money in exchange for the decryption key.

Ransomware attacks on governmental institutions, private sector organizations, and individuals are increasing at an alarming rate. These attacks have led to large financial losses, unrecoverable encrypted data, data leakage, and privacy concerns. According to some experts, new ransomware attacks occur every 11 seconds. In the face of these trends, the prompt and accurate detection of such attacks is desired to minimize further damage.

Existing techniques for identifying malware are often ineffective at identifying ransomware. Identifying ransomware can be modeled as a classification problem—a computing operation is either part of a ransomware attack, or it is not. Prior to the rise in popularity of artificial intelligence (AI) and deep learning models (DLMs), the traditional methods of statistics and machine learning were used to recognize if observed actions could be classified as ransomware or not. From the statistical perspective, a common approach is an application of Bayesian networks, the main goal of which is to model the relationship between the observed data and the type of attack as a graphical model. Note that Bayesian networks and the Bayesian neural networks discussed below are two different concepts.

Machine learning techniques have also been tried, including Naïve Bayes, Gradient Boosting, and Random Forests. However, despite the rich expressive power of deep learning models, training models successfully to obtain robust generalized results requires access to large amounts of training data. Unfortunately, data corresponding to ransomware attacks is sparse. Furthermore, what data exists tends to be very imbalanced—i.e., there are many fewer ransomware signals than traditional malware. For example, in some malware datasets, only 1% of incidents are associated with ransomware, while the remainder were caused by traditional malware. As a result, deep learning models such as Recurrent Neural Networks (RNNs), Long Short Term Memories (LSTMs) and Neural Ordinary Differential Equations (ODEs) lead to over-fitting. Overfitting happens when a model learns the detail and noise in the training data to the extent that it fails to generalize the problem, negatively impacting the performance of the model on new data.

It is with respect to these and other considerations that the disclosure made herein is presented.

SUMMARY

The techniques disclosed herein identify ransomware attacks as they are occurring, improving the security and functionality of computer systems. Ransomware attacks are identified using a new probabilistic machine learning model that better handles the unique properties of ransomware data. Ransomware data includes a list of computing operations, some of which are labeled as being associated with ransomware attacks. In contrast to deterministic machine learning techniques that learn weights, probabilistic machine learning techniques learn the parameters of a distribution function. In some configurations, a radial Spike and Slab distribution function is used within a Bayesian neural network framework to better handle sparse, missing, and imbalanced data. Once trained, the machine learning model may be provided with real-time operations, e.g., from a cloud service security module, from which to infer whether a ransomware attack is taking place. When a ransomware attack is detected, appropriate security measures are taken to stop, mitigate, and/or undo the attack.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
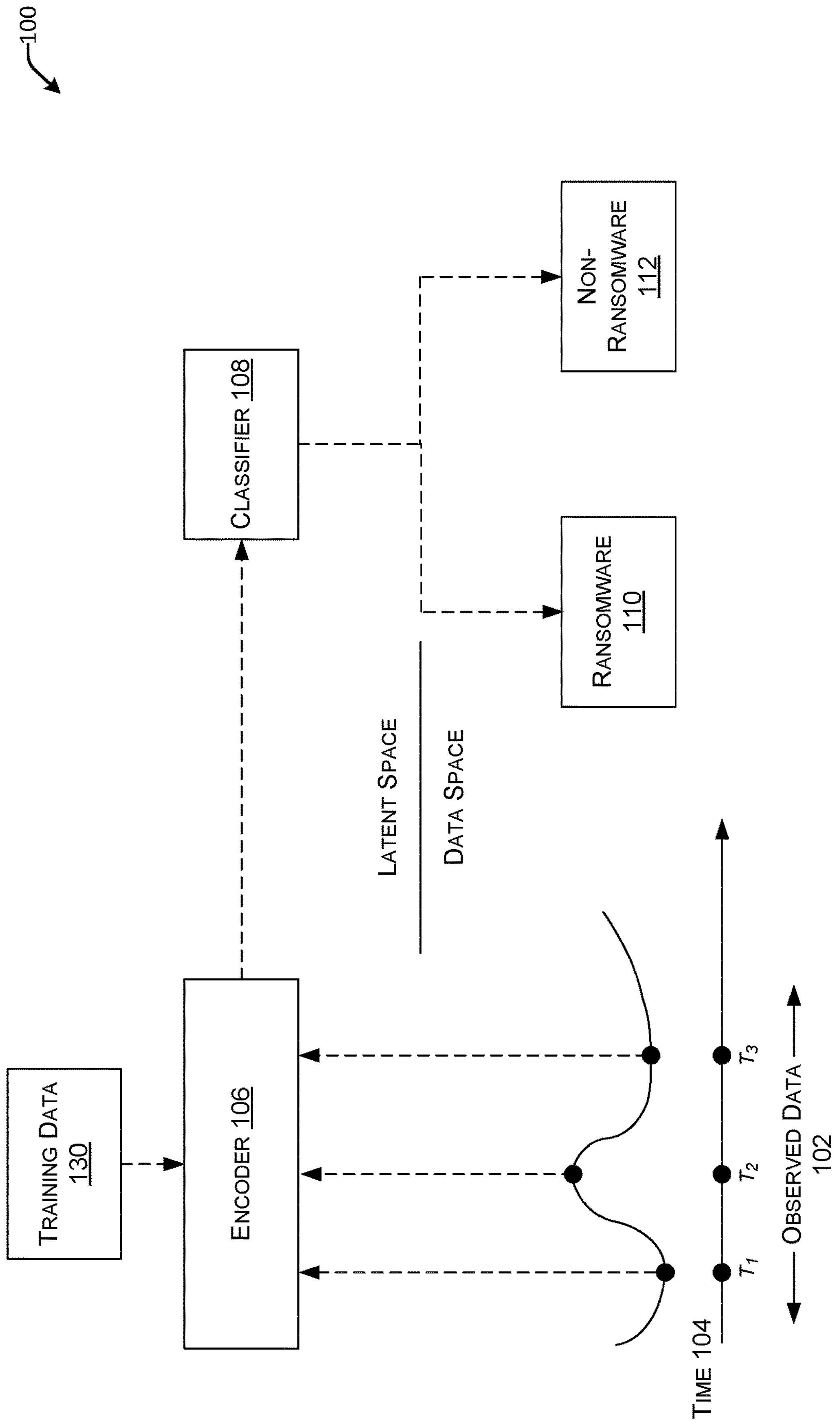
FIG. 1 illustrates a classification model used to determine whether one or more events are indicative of ransomware.

The techniques describe herein provide systems for identifying and mitigating ransomware attacks, thereby optimizing the use of computing resources and improving data security. Ransomware attacks fall into two main categories, automated ransomware which includes infamous cases such as WannaCry, and human operated ransomware (HumOR) conducted by actor groups. Although automated ransomware involves humans, the distribution of the payload usually does not involve human interaction. HumOR attacks, however, involve hands-on-keyboard activity, where an active human adversary has gained access to a network—whether through purchased access, malware, vulnerabilities, or other means—and moves through the kill chain to escalate privileges, moving laterally if able, and distributing ransomware in an environment. Human operated attacks tend to be more severe, as the adversary is able to take steps to bypass protections and work to ensure the ransomware payload is executed successfully. Security solutions will actively monitor for these suspicious events across the different kill chain stages in a ransomware attack to detect and alert on the malicious behaviors.

Ransomware attackers will typically utilize multiple toolkits, custom malware, and scripts to conduct their activity more effectively. Often this can also entail multiple operators for different stages in the kill chain, such as with Ransomware-as-a-Service (RaaS) attacks. RaaS attacks involve operators who work to create tools and provide access for vetted attackers—known as affiliates—to conduct the majority of the ransomware attack. Complicating manners, many of the tools ransomware attackers frequently use are open-source and have legitimate purposes, preventing outright detection and blocking unless the method of using the tools can specifically be classified as malicious.

There are several challenges when detecting and blocking ransomware attacks. First, there is a time criticality—detection is more useful the sooner it is achieved. Ideally, a good ransomware detection service can detect a ransomware attack prior to the encryption of any assets.

This entails detecting indications of an attack as early in the kill chain as possible. However, the early stages of an attack often do not have clear and specific implications of ransomware, and can often mirror attacks that are not ransomware in nature.

Second, although ransomware attacks are increasing and regularly reported in the news, they are still rare, and the labeled data is sparse. As a result, ransomware detectors are prone to overfitting. To avoid this limitation, a ransomware detection service will attempt to utilize training data from a large number of computers or mobile devices in order to create datasets that can learn to detect important behaviors.

Third, the system must generalize to handle polymorphism—operations that may be used by ransomware, other types of malware, or benign usage. Attackers may delay or reorder their activity, utilize legitimate open-source tools for malicious purposes, use polymorphic malware (e.g., backdoors) or scripts, or utilize fast flux networks for command and control as a means of avoiding detection. Finally, the input signals are often weak and often do not indicate a ransomware attack on their own. An effective ransomware detection service combines these low-level signals in order to produce a successful high-level detection.

In some configurations, a ransomware detection engine is deployed to monitor the operation of one or more computing devices. Real-time indications of operations performed by the computing devices being monitored are provided to the ransomware detection engine. The ransomware detection engine identifies particular computing operations as features that are relevant when distinguishing ransomware from other types of malware. In some configurations, a binary classifier has a positive class of ransomware attacks, and a negative class of any other type of computing behavior or operation. Similar or different features may be identified for use by multiclass classifier, e.g., classifiers that distinguish between ransomware, non-ransomware attacks (i.e., other types malware), and from benign use of the computing device. Other types of multiclass classifiers are similarly contemplated, such as those that distinguish between different ransomware families, different types of ransomware, etc. For example, a multiclass classifier may distinguish between ransomware family 1, ransomware family 2, other types of ransomware attacks, non-ransomware attacks, and benign incidents. Another multiclass classifier may distinguish between ransomware family 1, ransomware family 2, other types of ransomware attacks, non-ransomware family 1, non-ransomware family 2, other types of non-ransomware attacks, and benign incidents. Examples of different types of ransomware include HumOR or automated, as described above. Ransomware may similarly be categorized as coming from a threat actor group, or from a particular ransomware family. Ransomware families refer to collections of ransomware that share a common lineage, a common technique or pattern of techniques, a common target, or any other shared aspect.

The ransomware detection engine may then apply a machine learning model to a stream of features—i.e., a sequence of features representing computing operations that have taken place over a period of time. In some configurations, the machine learning model yields an indication that a computing operation is indicative of ransomware. In response, the ransomware detection engine may deploy mitigation features to stop, rollback, delay, or otherwise thwart the ransomware attack.

In some configurations, the machine learning model used by the ransomware detection engine is trained with a corpus of ransomware data containing lists of security incidents. In some configurations, each security incident has been labeled as part of a ransomware attack or as part of another type of attack. Additionally, or alternatively, ransomware data contains lists of potential security incidents, some of which are labeled as ransomware attacks, some of which are labeled as another type of attack, and some of which are labeled as benign—i.e., false alarms. In some configurations, ransomware incidents are additionally labeled with the ransomware type, e.g., HumOR or Automated, described above. Security incidents may be identified from a number of or pattern of events, where events may be produced by low-level event generators that were manually created by analysts (i.e., signatures) or that were trained by machine learning detectors and classifiers. One goal of the claimed embodiments is to build an alarm-recommendation system that can detect a possible ransomware attack and also provide an estimate of the uncertainty about the decision.

Features are extracted from incidents in the ransomware data. The extracted features are selected to capture the range of attack behaviors observed throughout the security incident. In some configurations, features are selected from those listed in the MITRE ATT&CK framework, which provides a knowledge base of adversary tactics, techniques, and procedures (TTPs), and is widely used across the industry for classifying attack behaviors and understanding the lifecycle of an attack. For example, the MITRE ATT&CK framework lists twelve different techniques that malware may use to execute malicious code, such as launching a command shell, leveraging inter-process communication, or manipulating a user into opening a malicious link. Seven techniques are listed for resource development, such as compromising email accounts, obtaining a digital certificate, or acquiring a server. Identifying features based on techniques defined in the MITRE ATT&CK TTPs has a number of benefits. For example, the list of techniques is comprehensive and it is widely used by industry.

While a detailed description of training the machine learning model based on ransomware data is provided below, briefly, ransomware data is trained in a supervised fashion. The response variable (i.e., label) represents whether the attack was ransomware or not, and covariates are a set of binary signals observed in time which indicate whether some MITRE event was activated or not. For example, one of the MITRE events represents whether 'OS credential dumping' has happened or not. Given a large domain of all possible MITRE Techniques, at each time point we observe a high-dimensional vector of size more than 700 different MITRE Techniques. However, because at each time step only very few actions are completed by the ransomware, one of the characteristics of the data is sparsity. To indicate how sparse, for almost every time step we observed less than 10 features out of 700, which means that less than 2% of the input vector has values set to 1, and the rest are 0.

In some configurations, ransomware data for a particular incident indicates which features were found at a given time step. An incident may span any number of time steps, but typically an incident may occur over tens, hundreds, or thousands of time steps. As referred to herein, the observed data $x_i$ of a possible attack i consists of a series of events at time steps t. Note that the set of observed time steps may be different for each incident included in the ransomware data. Moreover, the gap in time between each step may be different within a particular incident or between incidents.

In some configurations, input vectors containing labeled events are aggregated in a way that extends the period of time over which ransomware attacks may be identified. In some configurations, input vectors representing computing operations that have recently occurred are provided to the ransomware detection engine in real-time. In order to observe a sequence of events that is likely to be caused by ransomware, the machine learning model analyzes a sequence of input vectors over time—i.e., more than just the most recent input vector. However, in order to balance considerations of accuracy with efficiency and cost, the machine learning model may limit how many input vectors are considered when performing an inference operation. For example, the ransomware detection engine may limit the number of input vectors considered to a maximum number, e.g., up to 1000 input vectors at a time. Additionally, or alternatively, the ransomware detection engine may provide the machine learning model input vectors from a defined trailing window of time, e.g., the past hour.

However, ransomware may attempt to operate slowly in order to avoid bursts of activity that are more easily detectable—i.e., ransomware may attempt to avoid detection by spreading a sequence of suspicious computing operations over a period of time greater than the lookback period of input vectors provided to the machine learning model. To identify this type of attack, some information from an input vector may be considered beyond these time horizons by aggregating the information and providing this aggregated information as an additional feature—e.g., time-based features—to the machine learning model. This aggregation of information may outlive any given time horizon, allowing the extracted information to be considered over a longer period of time. For example, the ransomware detection engine may aggregate information extracted from the input vectors in a counter variable, such as a number of files that have been encrypted, or a running rate variable such as the number of files that have been deleted per minute. The ransomware detection engine may also process the extracted information, e.g., combining it with other extracted information or with externally derived information such as the time of day.

In some configurations, in order to identify ransomware attacks that progress to maturity at different rates, the ransomware detection engine trains and employs multiple machine learning models with data from different amounts of time. For example, one model may operate on the most recent minute's worth of input vectors, while another model may operate on the most recent five minutes worth of input models, etc. Other time periods such as an hour, two hours, or days or weeks later are similarly contemplated.

For each record xi, there is a corresponding label $y_i$ which indicates whether a ransomware attack was observed or not. As such, in some configurations, identifying whether an attack is ransomware is a binary classification problem. For an observed attack, the trained model returns the predicted label $\hat{y}^i$.

FIG. 1 illustrates a classification model used to determine whether one or more events are indicative of ransomware. Observed data 102 illustrates temporal data—e.g., real-time indications of computing operations—at times 104 of $t_1$, $t_2$, and $t_3$. These values are processed by encoder 106, which may map the values to a statistic $\bar{x}$ used by classifier 108 to predict whether the observed data 102 is indicative or ransomware or not. Additionally, or alternatively, encoder 106 may map the values to latent variables a latent space—a common approach in machine learning. As referred to herein, a latent variables are inferred, e.g. through a mathematical model, from other variables that are observed directly, e.g. from observed data 102. Classifier 108 may then use the latent space values to predict whether the observed data 102 is indicative of ransomware or not.

Encoder 106 and classifier 108 may be modeled in several ways. For example, encoder 106 may be a machine learning model trained on temporal information—i.e., a sequence of events that occurred in a computing system at particular points in time and which were later labeled as being associated with ransomware, other types of malware, or benign behavior. Additionally, or alternatively, encoder 106 and classifier 108 may be considered from a probabilistic perspective, as discussed below.

Observed data 102 consists of several values measured at different time steps t, and so the encoder 106 and/or classifier 108 may be modeled either by (a) temporal ignorant models, which do not handle temporal information in a specific way, or (b) temporal aware models, whose architectures assume that the input data contains an aspect of time. Non-temporal classification models cover a wide variety of tools from statistics, machine learning and deep neural networks. Examples of non-temporal classification include simple logistic regression, Bayesian networks, k-mean clustering, regression trees, fully connected networks and many other models. While these models perform well on nontemporal data, they must be adapted for use on data observed in different time steps. Two possible solutions include: (a) using the function of choice, aggregate vectors of input data (e.g., whether an alert was triggered) through all time steps $t \in T$ as p-dimensional vector $x^{\sim t}$, or (b) append time step t as a new variable, increasing the dimension of $x^t$ from p to $p+\max_i\{|T^i|\}$, where $|T^i|$ is the number of time-steps available for record i. The $\max_i$ appears because of the irregular time-steps for each record i. Once this transformation is applied, any non-temporal classification may be applied.

In addition to the non-temporal classification models discussed above, temporal aware classification models may also be applied. In addition, there are other modeling methods which are defined specifically for time-series data. For example, in statistics, multivariate time-series analysis can be conducted by application of Vector Autoregressive Models. However, despite the theoretical establishment behind these methods, they may be not powerful enough to describe the complicated temporal processes in ransomware data.

In contrast, the deep learning community, which is known for its over-parameterized models and ability to achieve rich representations of temporal processes, offers a wide variety of models, which account for temporal information. These deep recurrent models range from the traditional Recurrent Neural Network (RNN) and the Long Short-Term Memory (LSTM) models to the recently proposed type of continuous models, such as the Neural Ordinary Differential Equation (Neural ODE) models.

Training data 130 illustrates a labeled training set of sequences of computing operations that were observed during ransomware attacks, other types of malware attacks, and/or benign computer activity. Training data 130 is used to train classifier 108, as discussed in more detail below in conjunction with FIG. 3B.

Figure 2:
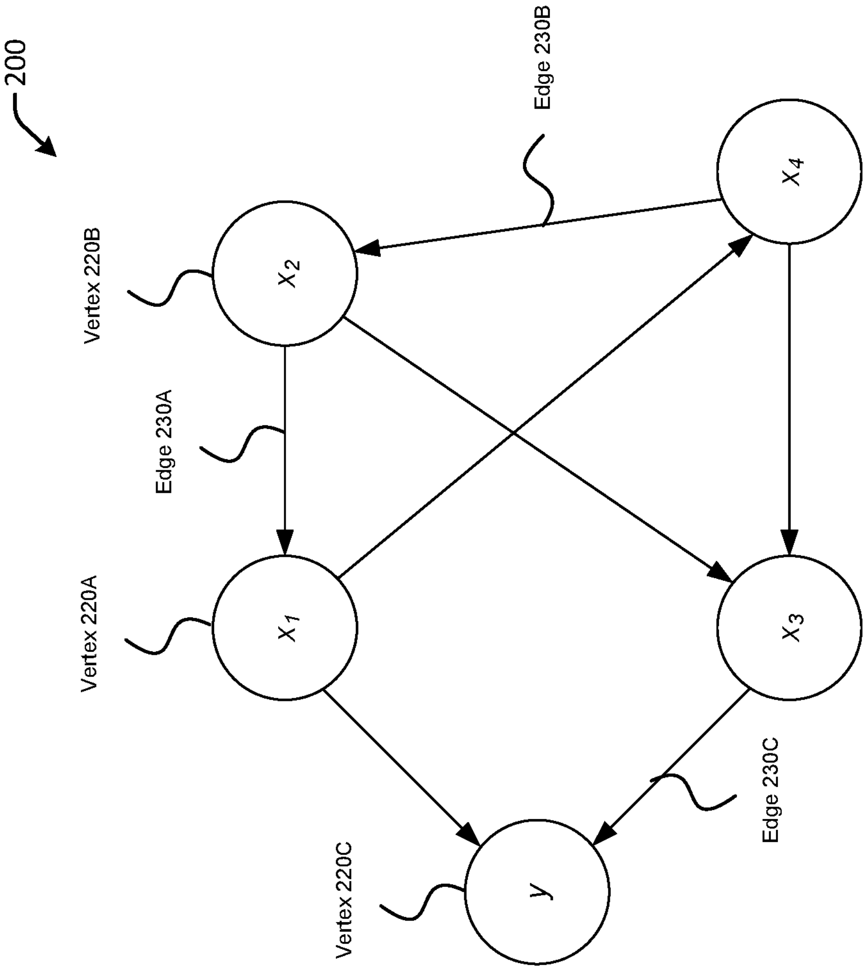
FIG. 2 illustrates a general version of a Bayesian network illustrative of a probabilistic method of modeling.

FIG. 2 illustrates a general version of a Bayesian network 200 illustrative of a probabilistic method of modeling. Neighbor classifiers and deep neural networks are considered to be deterministic models. In general, this means that a deterministic model does not include elements of randomness and that parameters of the model learn a point estimate during training. A deterministic model leads to the following behavior: every time application of a model to the same input results in the same output.

However, recently there is an increasing interest in probabilistic forecasts instead of point forecasts among machine learning practitioners, with the goal of generating an uncertainty of the prediction. Such types of forecasts can be generated by what is called ‘Probabilistic’ models. In addition to the ability to generate uncertainty of the forecast, probabilistic models provide mechanisms for the incorporation of prior knowledge, handling of noisy and missing data, and preventing overfitting in case of limited access to the training data.

In addition, probabilistic methods can also provide a causal interpretation of learned models. These features can be seen in one of the most known standard probabilistic techniques, Bayesian networks. Informally, given a set of different factors $x=\{x_1, \ldots, x_n\}$, e.g., signals recorded by software to detect an attack, and a response variable y, e.g., if a set of signals is ransomware or not, a Bayesian network models a connection between x and y.

Formally, a Bayesian network is a graphical representation of the joint probability distribution for a set of variables $x=\{x_1, \ldots x_n\}$ and y. It is described by a directed acyclic graph (DAG), e.g., in FIG. 2, where each vertex 220 $v_i$ corresponds to a random variable $x_i$ or y, and each edge 230 describes the conditional probability of $P(v_i|Pa_i)$ for each node $v_i$, given its parents $Pa_i$. The goal of a Bayesian Network is to reconstruct the structure of the relationship between all factors and nodes and derive the conditional probability, given the observed signals, e.g., $P(y|Pa_y)$.

Because the interpretability of these graphical models is high, the Bayesian Network fits well for predicting a ransomware attack, given, for example, the set of observed manipulations with the network. A practitioner can readily see how observing certain signals $x_i$ directly changes the probability of observing an attack y or any other signal $x_j$. Furthermore, since we can marginalize any variable out by summing over all possible states for that variable in the conditional probability computation, a Bayesian network is particularly useful for analyzing data with unobserved variables.

As discussed above, a probabilistic approach provides numerous benefits, such as uncertainty generation and an ability to incorporate prior knowledge through defining conditional probabilities in a Bayesian way. It is not surprising that the probabilistic approach was also extended to the application of Neural Networks (NNs) from two different concepts including the Variational Encoder (VE) and the Bayesian Neural Network (BNN). While both approaches are able to generate uncertainty in their predictions, the core ideas are different.

Figure 3A:
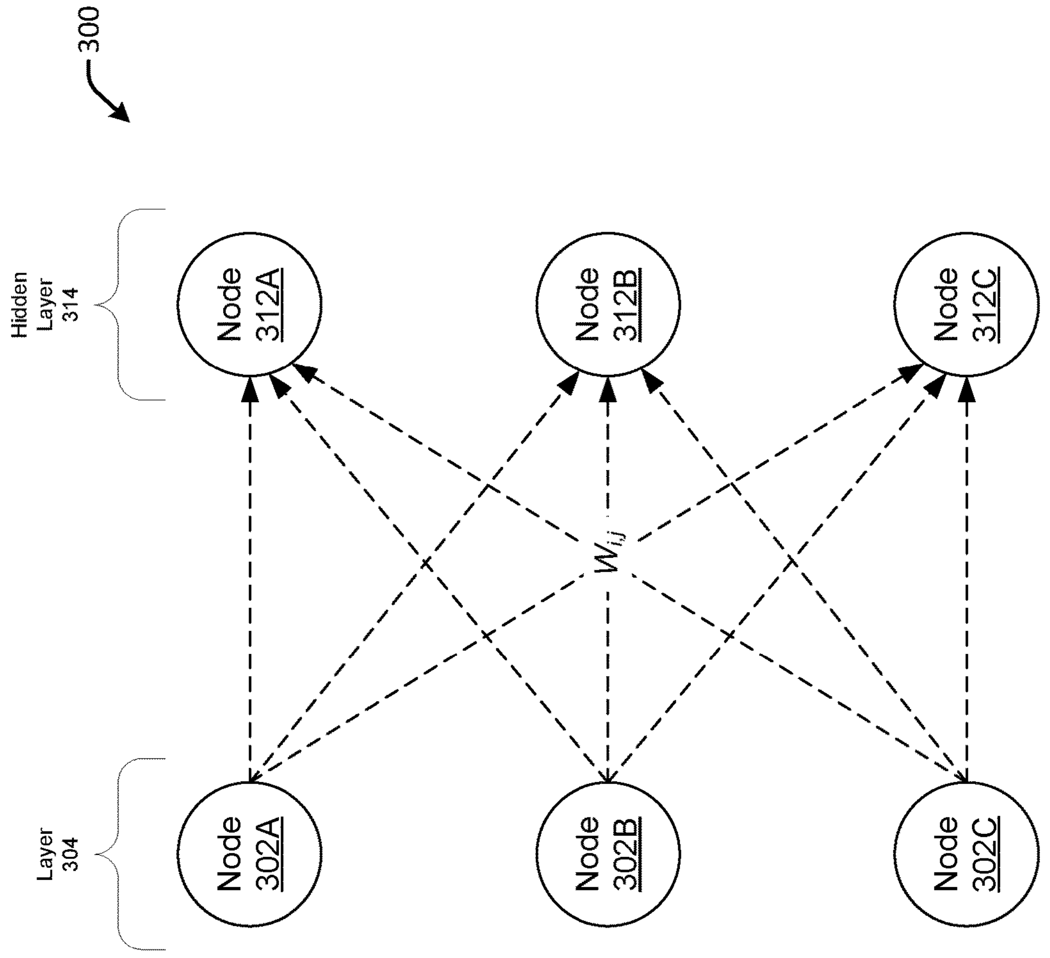
FIG. 3A illustrates a deterministic neural network.

FIG. 3A illustrates a deterministic neural network 300. Neural network 300 is a fully connected deterministic neural network in which the values of nodes 312 of layer 314 are computed based on the values 302 of layer 304 and weights $W_{i,j}$. For a deterministic neural network 300 all weights are considered to be deterministic parameters, which are learned during optimization. Evaluating a learned network on the same input multiple times results in the identical output, as illustrated below in FIG. 4A.

Figure 3B:
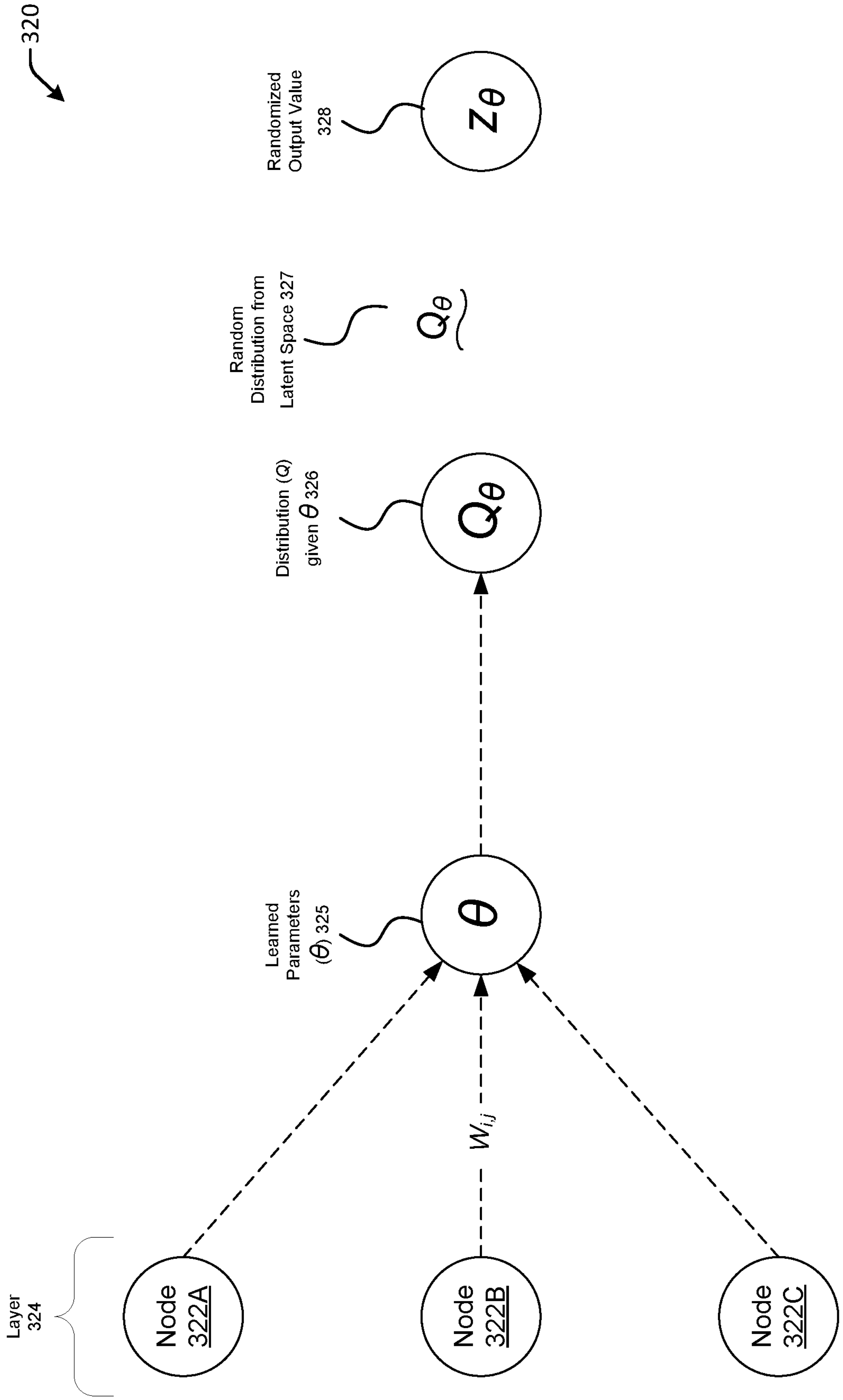
FIG. 3B illustrates a variational encoder (VE) neural network.

In contrast to the deterministic neural network 300, FIG. 3B illustrates a variational encoder (VE) neural network 320. A Variational Encoder models uncertainty by incorporating a random distribution in the latent space 327 into output value 328. For VE neural network 320, all weights of the network are still considered to be deterministic parameters. However, the latent space is a random vector, which is sampled from the distribution, defined by its learned parameters. Because of this stochasticity in the latent space, evaluating the learned network on the same input several times will generate different outputs, as illustrated below in FIG. 4B.

As illustrated, nodes 322 of layer 324 are multiplied by corresponding weights to determine learned parameter 325. Learned parameter may then be used to determine a distribution $Q_\theta$ 326, which is modified by a random vector from latent space 327 to yield randomized output value 328.

Figure 3C:
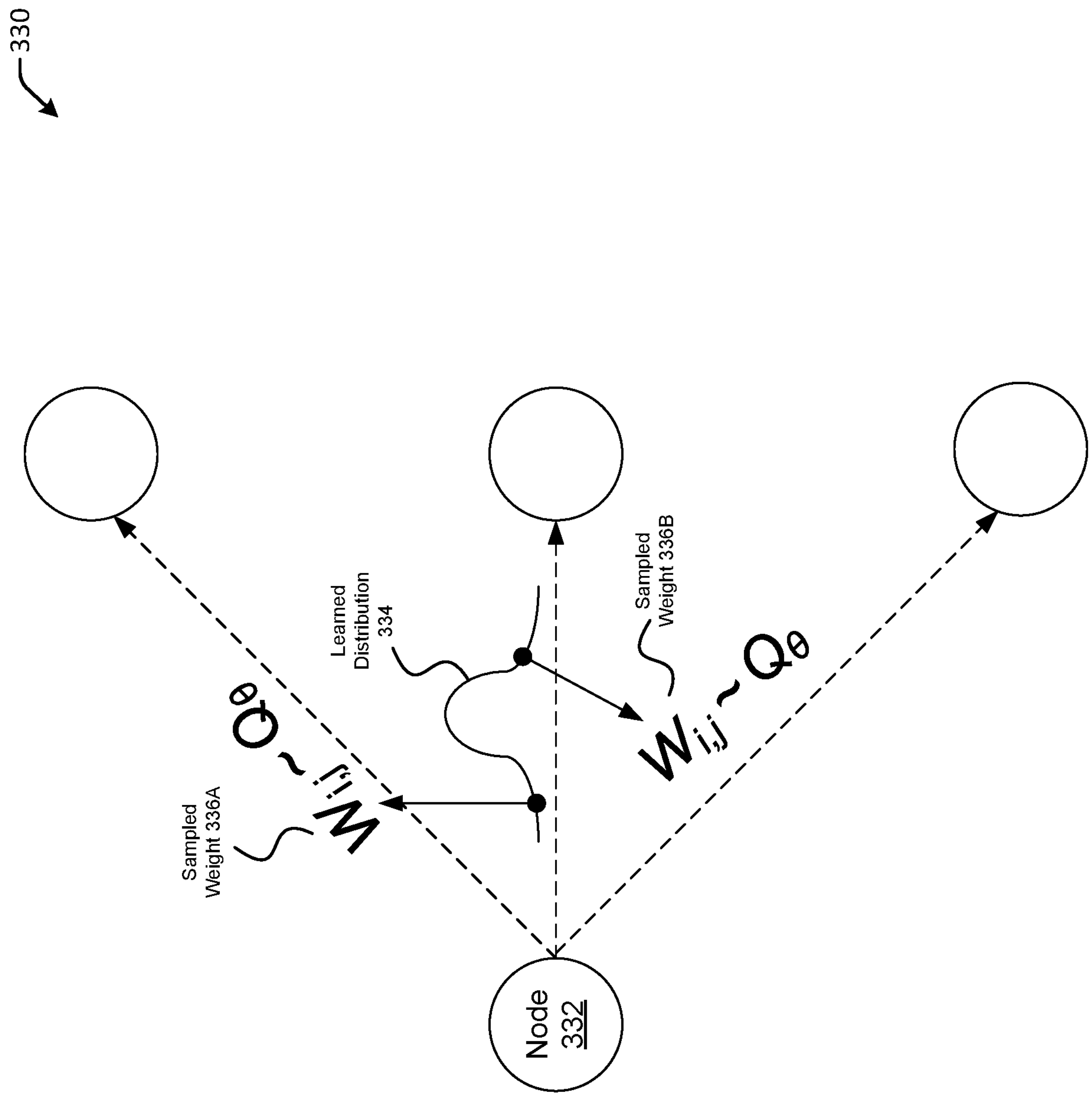
FIG. 3C illustrates a Bayesian neural network.

FIG. 3C illustrates a Bayesian neural network 330. A Bayesian Neural Network 330 incorporates uncertainty through each weight 336 of the network by sampling each model's weight from the learned distribution 334. As illustrated, sample weights 336 are obtained from learned distribution 334 and are combined with the value of node 332 to generate values for the next layer. Similar to the VE, evaluating a learned Bayesian neural network on the same input several times results in the different outputs (See FIG. 4B). However, this happens in the BNN not because latent space is random, but because the results from each layer is random. Both the VE and BNN share core concepts and are trained in a similar manner using Variational Inference.

During training, they both provide a prior distribution for the random samples, i.e., the latent space in a VE and the weights in a BNN. However, the idea of BNNs is closer to Bayesian networks, and a BNN provides more flexibility in defining different priors for each layer of the network. For these reasons some of the claimed embodiments for ransomware detection are utilizing the BNN, utilizing the flexibility of choosing the prior distribution to incorporate domain knowledge about specific signals.

Figure 4A:
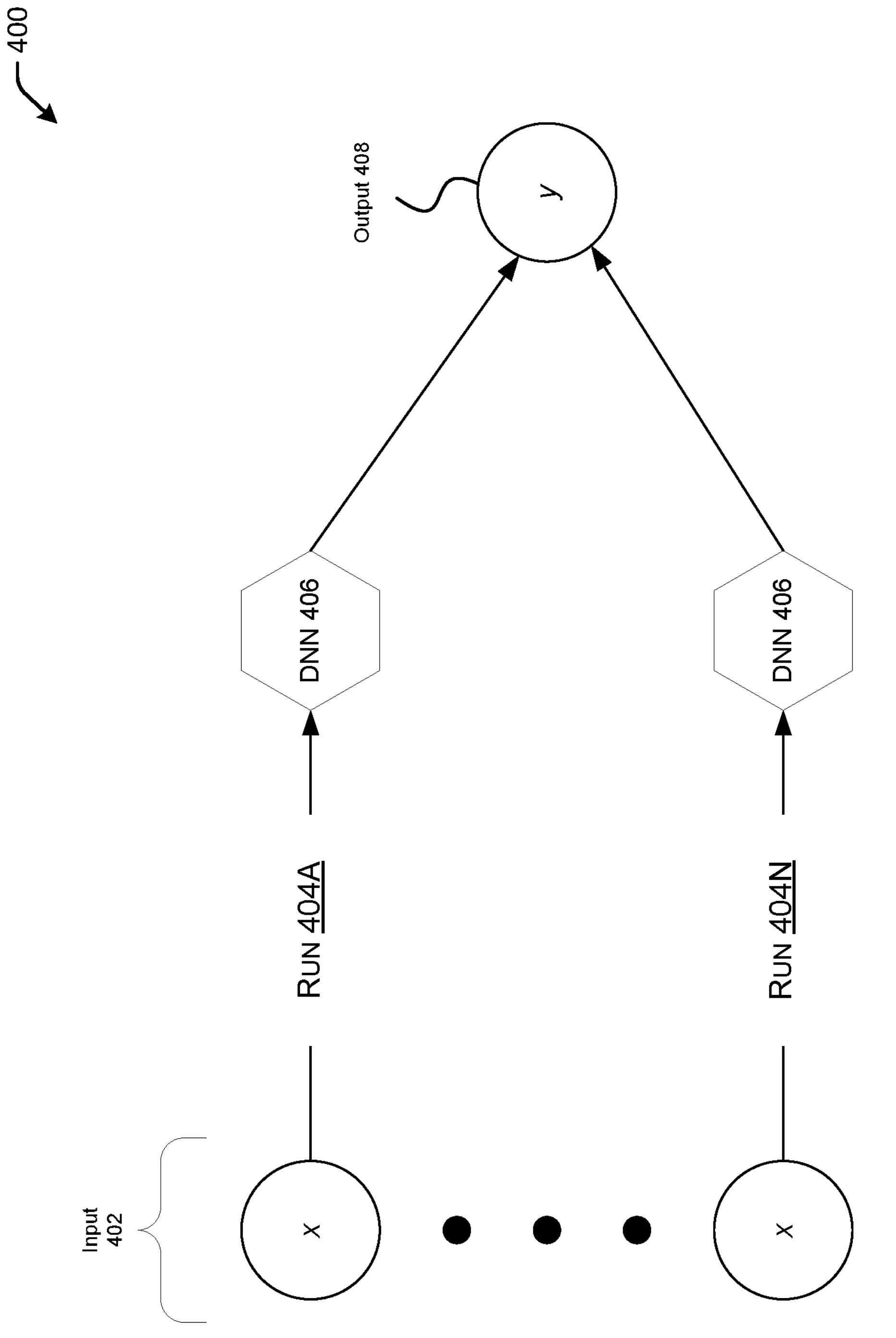
FIG. 4A illustrates repeated execution of a deterministic neural network.

FIG. 4A illustrates repeated execution of a deterministic neural network 400. N runs 404 of a deterministic model 406 on the same input x 402 results in the same output y 408.

Figure 4B:
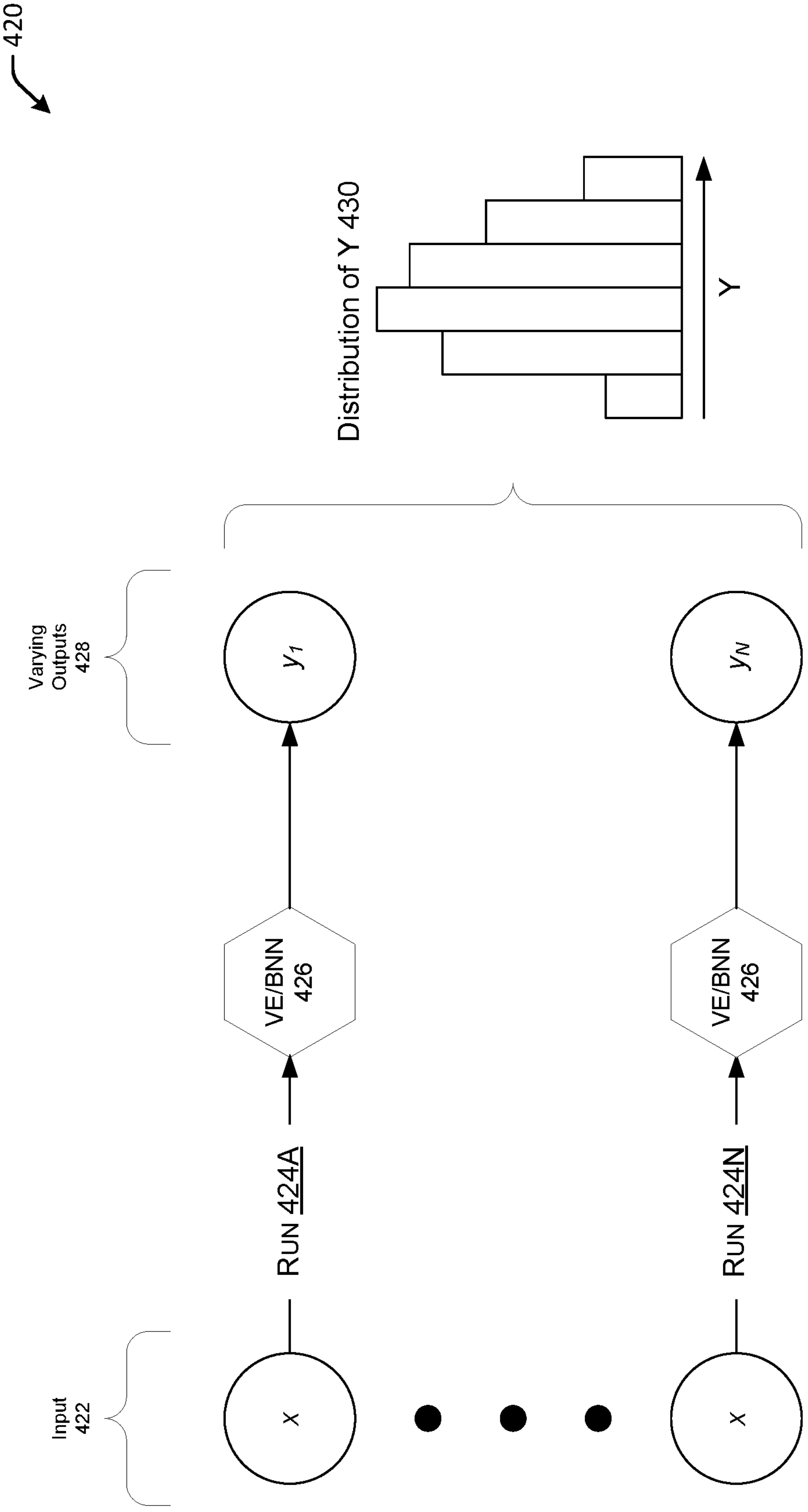
FIG. 4B illustrates repeated execution of a probabilistic neural network.

FIG. 4B illustrates repeated execution of a probabilistic neural network. Unlike deterministic models such as neural network 300, for probabilistic models 426, different runs 424 on the same input x 422 result in different outputs $y_i$ 428. This can be used to define the distribution of predictions y and derive follow-up statistics to demonstrate the uncertainty of the model, i.e., the Predictive Interval.

Vital features of probabilistic models, such as the ability to provide a notion of uncertainty, dealing with missing data, and preventing overfitting in a limited data regime, lead to a strong rise of interest in deep Bayesian learning. In this section we delve into more details regarding Bayesian neural networks, including different aspects of training the model and setting it up specifically to address problems of the data encountered in ransomware detection.

As mentioned above, a Bayesian neural network considers all weights as being samples from a random distribution. Formally, we denote the observed data as (x, y), where x is an input to the network and y is a corresponding response. Let all of the weights of a BNN, $W=(W^1, \ldots, W^D)$, be a random vector. To generate uncertainty of the prediction, we need to be able to compute p(y|x). However, since all weights of a BNN are considered to be random variables, we can rewrite conditional probability as $p(y|x)=\int_w p(y, W|x)\, dW=\int_W p(y|W, x)p(W|x)dW$. Typically, the likelihood term p(y|W,x) is defined by the problem setup, e.g., if we consider classification, as in ransomware incident detection, y~Bern (g(w,x)) for some function g, where Bern( ) is the Bernoulli distribution—i.e. a discrete probability distribution of a random variable that takes the value 1 with probability p and the value 0 with probability (1−p). Then, the main problem for training a BNN is to compute the posterior probability p(W|x), given the observed data x and a suitable prior probability for W.

As referred to herein, a prior probability, or just "prior", refers to the probability of an event before new data is collected. In the example discussed above, the prior probability of W is initially random. As referred to herein, a posterior probability, or just "posterior" refers to the revised probability after taking into consideration new information. In the example discussed above, the prior probability is the probability p(W), while the posterior probability is p(W|x)—i.e., the probability of W given x, where Wis the probability distribution of nodes in the Bayesian neural network and x represents the occurrence of a computing operation that has been deemed relevant to detecting ransomware.

In some simple cases of small neural networks, it may be possible to obtain a closed form solution for the posterior if we use conjugacy, i.e., conjugate priors where the prior and posterior are conjugate distributions. In other cases, this may not be possible, and one has to resort to sampling-based strategies, in particular, Markov Chain Monte Carlo schemes involving a Gibbs or Metropolis Hasting sampler. While such an approach affords excellent statistical behavior, scalability as a function of the dimensionality of the problem is known to be a serious issue. The alternative much more broadly used in machine learning and vision problems is Variational Inference (VI). The basic premise in VI is that approximating the posterior (using a known distribution family) may often be acceptable in practice if we concede that convergence of the estimated posterior to the true value will not be guaranteed as the sample size increases. Nonetheless, the computational advantages of VI are enormous and permit estimation procedures to proceed in cases which would not otherwise be feasible. VI is now a mature technology and its success has led to a number of follow-up developments focused on theoretical as well as practical aspects.

When using VI in Bayesian Neural Networks, we approximate the true unknown posterior distribution P(W|x) with an approximate posterior distribution $Q_\theta$ of our choice, which depends on learned parameters θ. Let $$W_\theta = \left(W_\theta^1, \ldots, W_\theta^D\right)$$

denote a random vector with a distribution $Q_\theta$ and probability distribution function (pdf) $q_\theta$, where D is the depth (i.e., number of layers) of the BNN. VI seeks to find θ such that $Q_\theta$ is as close as possible to the real (unknown) posterior P(W|x), accomplished by minimizing the KL (Kullback-Leibler) divergence between $Q_\theta$ and P(W|x). KL divergence, also called "relative entroy", is a statistical distance: a measure of how one probability distribution Q is different from a second, reference probability distribution P. A simple interpretation of the divergence of P from Q is the expected excess surprise from using Q as a model when the actual distribution is P. Given a prior pdf of weightsp with a likelihood term p(y|W,x), and the common mean field assumption of independence for $W_d$ and $W_\theta^D$ for $d \in 1, \ldots, D$, i.e., $$p(W) = \prod_{d=1}^{D} p^d\left(W^d\right) \text{ and } q_\theta(W_\theta) = \prod_{d=1}^{D} p_\theta^d\left(W_\theta^d\right),$$

Equation (1) computes θ, a parameter used to compute the weight of a node of the Bayesian neural network. The parameter θ is computed by finding the θ that minimizes the KL divergence $KL(q_\theta \| p)$, where $E_{q\theta}$[ln p(y|W, x)] refers to the expected value of the log of the probability of y—i.e. the probability that ransomware has been detected—given the weights Wand given the observed data x. Equation (2) describes minimizing the KL divergence between $q_\theta$—the approximation of the posterior distribution—and p—the prior distribution.

Equation (2) details how the KL divergence is computed—i.e., as the sum, for each layer in the neural network, for the expected value of the log of $q_\theta$ for the current weights minus the expected value of $q_\theta$ for the log of p for the given weights.

By definition of the expected value $E_{q\theta}$, the multi-dimensional integral is computed with respect to $\sim Q_\theta$ to solve (1). In case such integrals are impossible to compute in a closed form, a numerical approximation is used. One strategy is to use Monte Carlo (MC) sampling, which yields an asymptotically exact, unbiased estimator with variance $$O\left(\frac{1}{M}\right),$$

where M is the number of samples. For a function g(•):

$$E_{q_\theta}[g(w)] = \int g(w)q_\theta(w)dw \approx 1/M\sum_{i=1}^{M} g(w_i), \text{ where } w_i \sim Q_\theta. \quad (3)$$

The expected value terms in (1) and (2) can be estimated by applying the scheme in (3), and in fact, even if a closed form expression can be computed, an MC approximation may perform similarly given enough samples. Given a mechanism to solve (1), the main consideration in VI is the choice of prior p and the approximate posterior $q_\theta$. A common choice for p and $q_\theta$ is Gaussian—i.e., having a "normal" distribution in the probability theory sense—which allows calculating (2) in a closed form. However, this type of distribution is mainly used for computational purposes and does not reflect the nature of the data. Choosing a correct distribution, especially the one which can incorporate the features of the analyzed data, is an open problem. In the next section we discuss our proposed distribution, which naturally fits the data encountered in ransomware incident detection.

The features of the data are important to encapsulate in the model design. The sparsity of the data is a common problem in many areas and was previously approached from different perspectives. For example, in the statistics community sparsity can be addressed with both Stochastic Regression Imputation and Likelihood Based Approaches. In the machine learning community, methods based on k-nearest neighbor and iterative techniques have been developed, including approaches with neural networks. Another way to tackle sparsity comes from regularization theory via L1 regularization, e.g., group LASSO, sparse group LASSO and graph LASSO.

Figure 5:
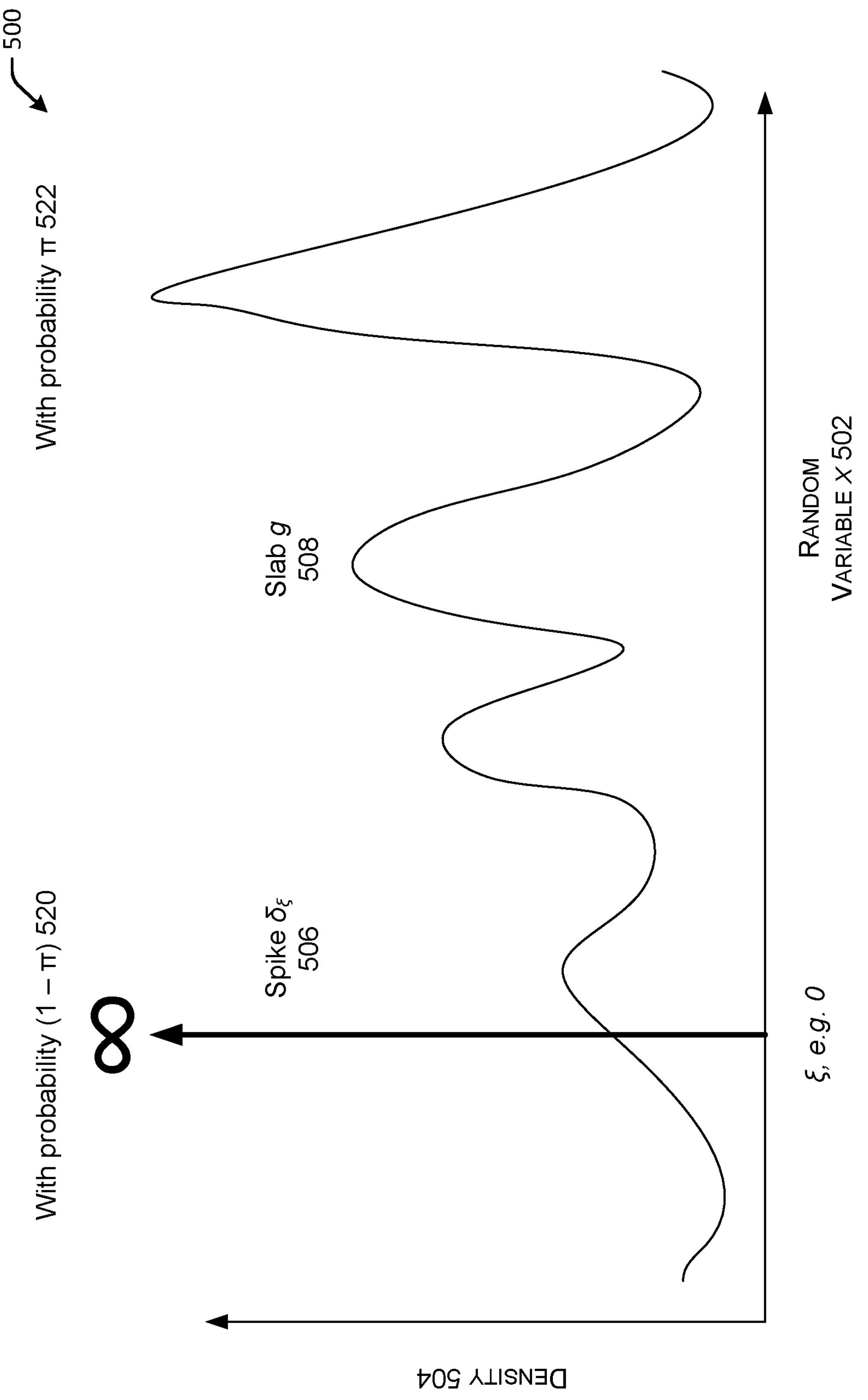
FIG. 5 illustrates a Spike and Slab distribution.

However, we are interested in a probabilistic approach to address the sparsity in our data. From the probabilistic perspective, a common way to account for sparsity of the data in the model is to consider an appropriate distribution. For example, the distribution can be the Horseshoe distribution or derivatives of the Laplace distribution. Another common way is, instead of one distribution, to consider the mixture of priors with Spike and Slab components which have been widely used for Bayesian variable selection. In general, the form of the Spike and Slab distribution for random variable x can be written as:

$$x \sim (1-\pi)\delta_\xi + \pi g, \quad (4)$$

and presented in FIG. 5, where π is a probability 522 for each mixture component, δ is spike component, the Dirac delta function, such that $$\delta(x) = \begin{cases} +\infty, & x = \xi \\ 0, & x \neq \xi \end{cases} \text{ and } \int_{-\infty}^{\infty} \delta(x)dx = 1,$$

and g is the slab component, which is a general distribution of the practitioner's choice. The general idea is to explicitly introduce the sparsity component in the distribution of the data, allowing the probability mass to fully concentrate on ξ=0 with probability 520 1−π, and with probability 522 π spread the mass over the domain of the slab component g. Notice, that π can be considered as a random variable itself, e.g., π~Bern(λ), where λ is either a learned parameter or a fixed value that is provided by a specialist. "x~" refers to the probability distribution of x. The spike component effectively represents a sparse variable—i.e., a variable that predominantly has the value zero—because the probability distribution can represent zero without affecting the distribution of non-zero values. This allows a more accurate distribution of non-zero values of x.

The next questions are: (1) how can the 'Spike and Slab' distribution be applied in a BNN, and (2) which slab component g should we consider?

Spike and Slab BNN. Recall that in the BNN, all weights W of the neural network are considered to be random variables, and to use VI to solve (1), it is necessary to provide priors on W, p and the approximate posterior $q_\theta$. Incorporating a Spike and Slab distribution on both priors for p and approximate posterior q, samples $w_p$ from p and $w_q$ from q have the following distribution:

$$w_p|\pi_p \sim (1-\pi_p)\delta_0 + \pi_p g_p \text{ and } w_q|\pi_q \sim (1-\pi_q)\delta_0 + \pi_q g_q, \quad (5)$$

where $\pi_p$~—the distribution of the prior probability p—is Bern($\lambda_p$)—the Bernoulli distribution of learned parameter/fixed value λ, $\pi_q$—Bern($\lambda_q$) is the distribution of the posterior probability q, and $g_p$ and $g_q$ are prior slab distributions and posterior slab distributions of our choice. Recall the main goal of VI is to learn parameters θ of an approximate posterior $q_\theta$, by minimizing (2). First, we state Theorem 5.1, which allows us to compute the KL term between two general Spike and Slab distributions.

Theorem 6.1. Given two general Spike and Slab distributions such that: $p(w|\pi_p)=(1-\pi_p)\ \delta_0(w)+\pi_p g_p(w)$, $q(w|\pi_q)=(1-\pi_q)\ \delta_0(w)+\pi_q g_q(w)$, $\pi_p$~$p(\pi)$=Bern($\lambda_p$), and $\pi_q$~$q(\pi)$=Bern($\lambda_q$), with $\delta_0$ being a dirac delta function at 0 and $g_p$, $g_q$ are the pdfs of the distributions of our choice, the KL(q(w,π)||p(w,π)) is equal to:

$$KL(Bern(\lambda_q)\|Bern(\lambda_p)) + \lambda_q KL(g_q\|g_p). \quad (6)$$

$$\text{Proof: } KL(q(w,\pi)\|p(w,\pi)) = \int_\pi\int_w \log\frac{(q(w,\pi)}{p(w,\pi)}q(w,\pi)dw\ d\pi$$

given that $q(w,\pi) = q(w,\pi)q(\pi)$ and $p(w,\pi) =$ $$p(w|\pi)p(\pi) = \int_\pi\left\{\int_w \log\frac{(q(w,\pi)}{p(w,\pi)}q(w|\pi)dw\right\}q(\pi)d\pi$$

given that $q(\pi) = Bern(\lambda_q)$ and $p(\pi) =$ $$Bern(\lambda_p) = q(\pi=0)\left\{\int_w \log\frac{q(w|0)q(\pi=0)}{p(w|0)p(\pi=0)}q(w|0)dw\right\} +$$

$$q(\pi=1)\left\{\int_w \log\frac{q(w|1)q(\pi=1)}{p(w|1)p(\pi=1)}q(w|1)dw\right\} = (1-\lambda_q)\left\{\log\frac{1-\lambda_q}{1-\lambda_p}\right)$$

$$\int_w \delta_0(w)dw\right\} + \lambda_q\left\{\log\frac{\lambda_q}{\lambda_p} + \int_w \log\frac{g_q(w)}{g_p(w)}g_q(w)dw\right\} =$$

-continued $$(1-\lambda_q)\log\frac{1-\lambda_q}{1-\lambda_p}+\lambda_q\log\frac{\lambda_q}{\lambda_p}+\lambda_q\int_w\log\frac{g_q(w)}{g_p(w)}g_q(w)dw = KL(Bern(\lambda_q)\|Bern(\lambda_p))+\lambda_q KL(g_q\|g_p).\square$$

Choice of $g_q$ and $g_p$: Radial distribution. So far, we've shown results for a general Spike and Slab distribution. One important question is which slab components g we should consider, and if $g_q$ and $g_p$ should be from the same family. Authors have considered both $g_q$ and $g_p$ to be the Gaussian distribution. However, there is emerging evidence that the Gaussian assumption in general may not work well for medium to large-scale Bayesian neural networks. Authors regard this as being caused by the probability mass in a high-dimensional Gaussian distribution concentrating in a narrow "soap-bubble" far from the mean. For this reason, a Radial distribution(μ,σ) has been proposed, where samples can be generated as:

$$\mu+\sigma*\frac{\xi}{\|\xi\|}*|r|\sim \text{Radial}(\mu,\sigma), \tag{7}$$

where ξ~MVN(0, I), r~N(0,1)—the distribution of ξ is the multivariate normal distribution from 0 to 1, and the distribution of r is the normal distribution from 0 to 1. As with a gaussian distribution, μ and σ are parameters that define the radial distribution. Then, we set up our approximate posterior $g_q$ to be the Radial distribution (μ, σ), while the prior $g_p$ is Normal(0, 1). "g" refers here to the distribution—$g_p$ being the prior distribution of the weights W, and $g_q$ being the posterior distribution of the weights. This heterogeneous setup begins with a prior distribution that is Normal—i.e., Gaussian, while producing a posterior distribution that is Radial. Any other pairing of distributions is similarly contemplated, including a Radial distribution for the slab of the prior distribution and a Gaussian distribution of the slab of the posterior distribution, or some other combination of some other type of distribution (e.g., Bernoulli). Also, both prior and posterior distributions may have the same slab distribution.

Given equation (6), it is necessary to define the $KL(g_q\|g_p)$ term. Unfortunately, a closed form solution for our choice of $g_q$ and $g_p$ is not available, and it is necessary to approximate the KL term using the Monte Carlo procedure from equation (3). This process leads to (up to a constant):

$$KL(g_q\|g_p)\approx -\log\sigma-\frac{1}{M}\sum_{i=1}^{M}\log[p(w_i)], \tag{8}$$

where $w_i$ is sampled from the Radial distribution (μ, σ) as described in equation (7). Note that running an MC approximation for large M, can lead to running out of memory in either a GPU or RAM. To tackle this issue, we follow apply a graph parameterization for our Radial Spike and Slab distribution, allowing us to set M=1000 without exhausting the memory.

Reparameterization trick: Gumbel-softmax. Given Theorem 5.1, we can rewrite the minimization problem in equation (1) as:

$$\theta^* = \underset{\theta=(\lambda_q,\theta_q)}{\text{argmin}}\ KL(Bern(\lambda_q)\|Bern(\lambda_p))+\lambda_q KL(g_q\|g_p)-\mathbb{E}_{q_\theta}[\ln\ p(y|W,x)]. \tag{9}$$

where $\theta=(\lambda_q,\theta_q)$, $\theta_q$ are the parameters of $g_q$, and $q_\theta$ is a pdf with a Spike and Slab approximate posterior. We have previously discussed how to handle the KL terms found in equation (9). Next, there are two main aspects left for our attention: (1) computing $E_{q\theta}$ [ln p(y|W,x)], which is usually approximated with Monte-Carlo because of the intractability issue, and (2) how to do back-propagation for optimization. The problem with back-propagation is that sampling directly from, e.g., w~N(μ,σ) with learnable parameters μ and σ, does not allow us to propagate through those parameters, and thus, we cannot learn them. This issue is addressed by applying a local-reparameterization. For example, instead of sampling from w~N(μ,σ), we sample from z~N(0,1) and perform the operation: w=μ+σz. Variable z has a normal distribution, and weight w is computed in terms of the μ and σ of the normal distribution of z. This allows a backpropagation technique to optimize the loss with respect to μ and σ.

While the local-reparameterization technique is useful for members of a location-scale family, like the Gaussian distribution and even for the selected Radial distributions, it is not obvious how to apply this technique when we consider the Bernoulli distribution, Bern(λ), in (9). One way to address this issue is to approximate samples from the Bernoulli distribution with the Gumbel-softmax. That is, π~Bern(λ) is approximated by $\tilde{\pi}$~Gumbel-softmax(λ, τ), where $$\tilde{\pi}=\left(1+\exp(-\eta/\tau)\right)^{-1},\ \eta=\log\frac{\lambda}{1-\lambda}+\log\frac{u}{1-u},\ \text{and}\ u\sim\mathcal{U}(0,1).$$

Here, τ is the parameter which is referred as the temperature. When τ approaches 0, $\tilde{\gamma}_i$ converges in distribution to $\gamma_i$. However, in practice, τ is usually chosen no smaller than 0.5 for numerical stability. When using Gumbel-softmax approximation, instead of optimizing the loss for parameter $\lambda_q$, we consider a new parameter $$\theta_\pi=\log\frac{\lambda_q}{1-\lambda_q}.\ \text{Thus, }\lambda_q=S(\theta_\pi)=\frac{1}{1+e^{-\theta_\pi}}.$$

Final Loss and Method Summary. Below is a step-by-step summary of one of the claimed embodiments:

Algorithm 1: Learning the posterior distribution of a BNN p(W|x) with a Radial Spike and Slab approximate posterior, to account for sparsity of the data.

Input:

1. Neural Network of depth D with
2. Weights $$W_\theta = (W_\theta^1, \ldots, W_\theta^D),$$

which have

3. Spike and Slab Radial distribution $Q_\theta$ with pdf $q_\theta$ such that $$q(w|\pi_q) = (1-\pi_q)\delta_0(w) + \pi_q g_q(w; \mu, \sigma),$$

$g_q(w; \mu, \sigma)$ is pdf of Radial($\mu$, $\alpha$)

$\pi_q$~Bern($S(\theta_\pi)$), where S is the softmax, and

4. Prior Spike and Slab distribution $P_\theta$ with pdf p, such that $$p(w|\pi_p) = (1-\pi_p)\delta_0(w) + \pi_p g_p(w; \mu_p, \sigma_p),$$

$g_p(w; \mu_p, \sigma_p)$ is pdf of Gaussian distribution $$\pi_p \sim Bern(\pi_p)$$

Output: Learned parameters $\theta=(\theta_\pi, \mu, \sigma)$

Require: Prior distribution's parameters ($\pi_p$, $\mu_p$, $\sigma_p$)

5. while $\theta$ has not converged do
6. Minimize VI loss in equation (10), by using gradient descent algorithms (e.g., SGD or Adam) and doing:
7. Forward Pass: to compute y with local reparameterization trick for both Radial and Bernoulli (using Gumbel-Softmax)

KL terms and expected log-likelihood term, using combination of closed-form and MC
8. Backward pass: compute gradients of $\theta$
9. end while Algorithm 2: Final loss used for optimization in Algorithm 1.

Original:

$$KL(Bern(\lambda_q)\|Bern(\lambda_p)) + \lambda_q KL(g_q\|g_p) - E_{Q_\theta}[\ln p(y|W, x)]$$

Final:

$$L = \sum_{\substack{j=1,\ldots,D\\k=1,\ldots,l_j}} KL_{jk} - E_{Q_\theta}[\ln p(y|W, x)], \text{ where} \quad (10)$$

$$KL_{jk} = \quad (11)$$

$$(1-S(\theta_\pi^{j,k}))\log\frac{1-S(\theta_\pi^{j,k})}{1-\lambda_p^{j,k}} + S(\theta_\pi^{j,k})\log\frac{S(\theta_\pi^{j,k})}{\lambda_p^{j,k}} + S(\theta_\pi^{j,k})\Big\{-\log\sigma^{j,k} - \frac{1}{M}\sum_{i=1}^{M}\log\big[p(W_i^{j,k})\big]\Big\}$$

Note that based on the meanfield assumption of a BNN, the final loss L includes the sum over all $KL_{jk}$ terms, which are computed for each k-th weight $W^{j,k}$ of the j-th layer of the BNN with parameters $$\theta^{j,k} = \theta_\pi^{j,k}, \mu^{j,k}, \sigma^{j,k}).$$

In this case, the final set of trainable parameters is $\theta=\{\theta^{j,k}\}$ for j=1, . . . , D and k=1, . . . , $l_j$. In addition, $E_{Q_\theta}$ can be computed either in a closed-form or approximated by MC, depending on the complexity of the BNN.

Figure 6A:
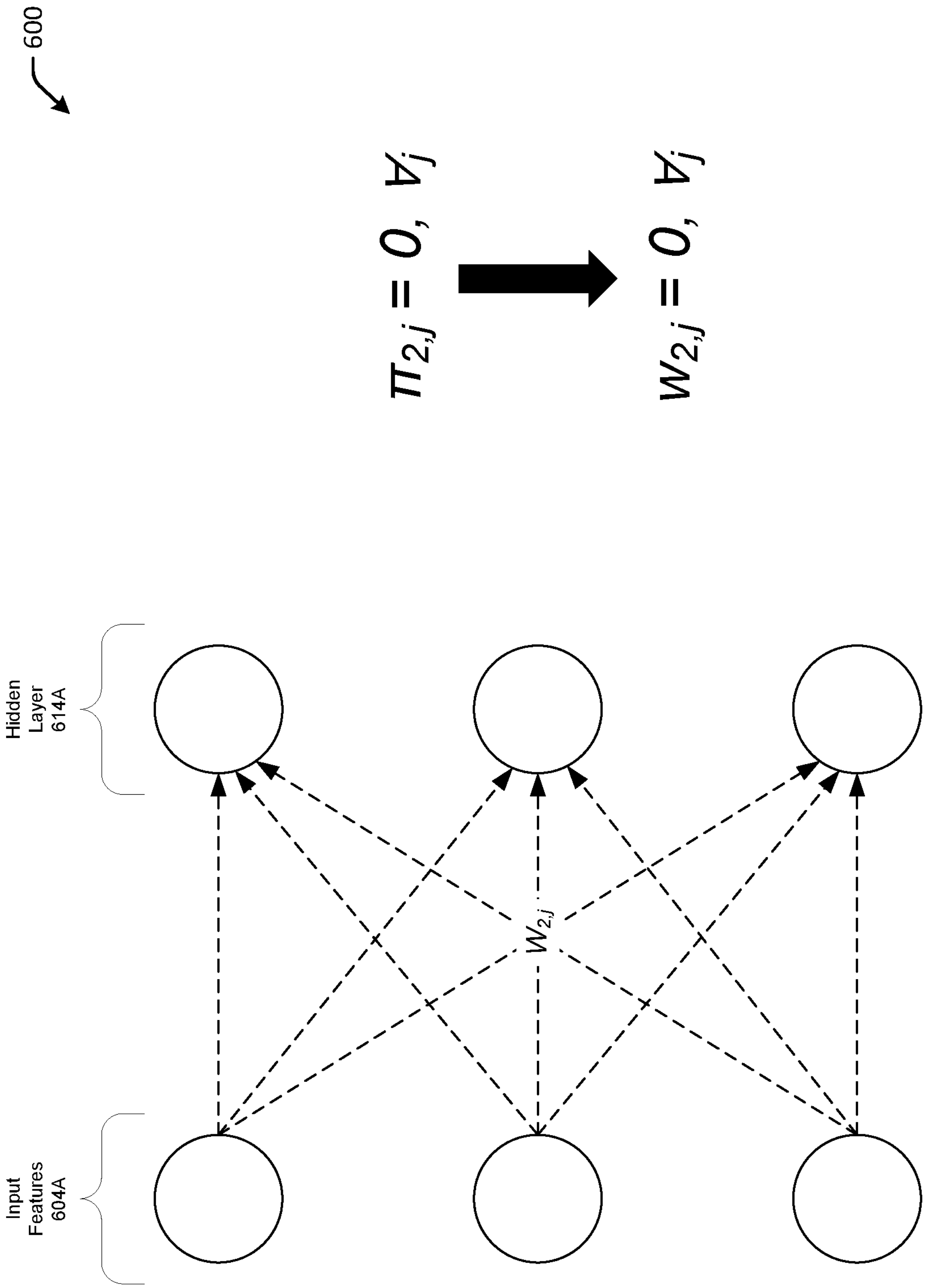
FIGS. 6A and 6B illustrate the interpretation of a Spike and Slab distribution as a feature selection method.
Figure 6B:
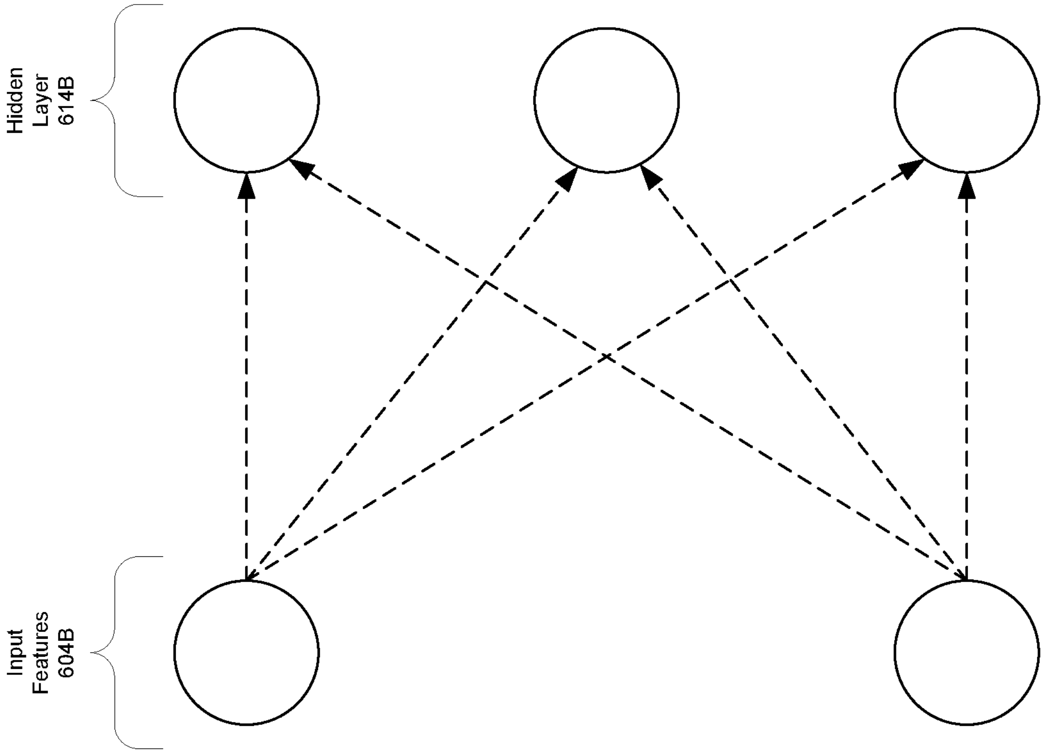

FIGS. 6A and 6B illustrate the interpretation of a Spike and Slab distribution as a feature selection method, by changing values of prior probability $\pi_p$ in the first layer of Bayesian Neural Network 600.

One of the features of our proposed method of using Spike and Slab distributions is an ability to incorporate prior information in p, which can be obtained from different sources. For example, in Ransomware Incidents detection this knowledge can be acquired from human experts, who understand which signals are significant to identifying Ransomware. Note that probability $\pi_p$ in prior p(w|$r_p$) indicates if corresponding weight w of the BNN should be sampled as 0 (spike term) or not (slab term). Recall that Spike and Slab prior is commonly used for variable selection, and thus $\pi_p$ in the first layer of BNN can be interpreted as feature selection of the specific input feature. For example, consider the first layer of Fully Connected Neural Network 600 illustrated in FIG. 6B. By providing $\pi_i$ close to 0 for the second input feature, we can exclude it from propagating through the network, as illustrated in FIG. 6B.

Experts' opinion. One approach to incorporating an expert's opinion is to request experts to provide their opinion on how important every input feature/signal is, and to make a prediction if the sequence with such signals is likely to be a ransomware. Since prior probabilities, whether a feature should be included or not, are defined as Bernoulli $\pi_p$~Bern($\lambda$p), based on this ranking, for each feature i (e.g. which of the MITRE ATT&CK operations associated with malware attacks) we can define $$\lambda_{p,i} = \frac{1}{r_i}c,$$

where ri is importance ranking of feature i and c is an 'effect' constant, which shows how much of the probability you want to assign for the feature with rank 1. Since we define prior probabilities and BNN still learns the posterior distributions, we suggest to assign c=0.9, which makes $\lambda$p=0.9 for a feature with ranking 1. We then use these probabilities as a prior for Spike and slab of the first input layer.

TABLE 1

An example of our proposed method: incorporating in Spike and slab prior, expert information regarding features' importance to predict Ransomware Incident. For this example 'effect' constant is selected to be 0.9.

| Input Feature | Importance to make decision Ransomware or Not | Prior probability $\lambda_{p,i} = \frac{1}{r_i}c$ |
|---|---|---|
| Feature 1 | 1 | 0.9 |
| Feature 2 | 20 | 0.045 |
| . . . | . . . | . . . |
| Feature N | 3 | 0.3 |

Experiments:

The efficacy of the proposed Bayesian neural network for the task of ransomware detection is evaluated in this section. A key feature of cybersecurity attacks is the rapid development of new threat vectors, polymorhphic changes, and exploits to conduct new variants in a short period of time. These changes make it harder for the defender to re-utilize the previous model and requires constant retraining, which increases the cost of production. For example, the TTPs and malware, which were used a year ago to conduct a ransomware attack, might not be a good predictor of a current attack. For this reason, the evaluation is not only the ability of the disclosed model to classify ransomware attacks on a familiar dataset, but also how well the disclosed model preserves prediction power on an unseen dataset, observed in the future, where a different set of TTPs were utilized to conduct an attack. To achieve this evaluation goal, in addition to training data set, two testing data sets are considered, obtained in different periods of time. One is 'within testing'—testing data which covers the same time period as training data, and 'outside testing'—testing data on a completely different time period in the future.

Data description. The proposed Radial Spike and Slab Bayesian neural network model and several baselines of two sets of real attacks that were observed in industry. As described previously, each attack is represented by a temporal sequence of events from a knowledge base of TTPs with an assigned label, which indicates whether it is ransomware or another type of attack. First, for the initial dataset, 201 incidents labeled as Ransomware were provide and 24,913 with Non-Ransomware labels. All of the samples in this dataset included 706 sparse binary features and were also deduplicated. This data set was randomly split with 80% of the examples assigned to the final training set, and the remainder were used to create the 'within testing' set. Second, for the 'outside testing' set, a newer, deduplicated dataset was used, making it independent of the training set and 'testing' set. This dataset included Ransomware incidents and 9224 Non-Ransomware incidents. An important feature in the 'outside testing' set, is that new TTP covariates of attacks were observed, which were not seen before during the training or 'within testing' sets. Because trained models have a hard constraint on the input dimension of the data, new features appearing only in the 'outside testing' set were removed, but the records of the corresponding attacks were preserved for evaluation, making these examples more difficult to classify.

Preprocessing of temporal information. To reduce the number of time steps, all TTP events observed within a one second window after the appearance of the first alert following the previous time step were aggregated. This results in very few signals being recorded per aggregated time step. We see that the majority of the data has very limited number of features per one second, namely less than 10 out of 706 possible. For this reason, all features in the period of one minute where the start of the time steps are on one second boundaries were aggregated. In reality, a one minute latency is acceptable if that improves the quality of the prediction, especially if the recommendation system is developed with a human in the loop, rather than automatic software which disables the computer or blocks network access completely.

Baselines. several baselines were considered for both the temporal and probabilistic settings. From the temporal perspective, two models were considered, including the Recurrent Neural Network with a GRU cell (RNN) and the ODE-RNN. As mentioned above, the original RNN ignores the value of the time steps and only considers the order (i.e., index), in contrast to ODE-RNN which accounts for the time step value. Note, originally, several temporal models were considered which do not account for the time value, like the traditional RNN, the RNN with a GRU cell, the LSTM, and the Bi-directional LSTM. However, among all of these models, the RNN with the GRU cell performed the best.

From the probabilistic perspective, two models are considered. One is the deterministic fully connected network (FC) and the other is the disclosed model, the Spike and Slab radial Bayesian neural network. For these two networks, temporal aspects are ignored by aggregating all available features per entry with the 'logical or' operator. Since the features in this example binary (i.e., ransomware or non-ransomware), aggregation corresponds to summarizing the information into the set of events which occurred during an attack. In addition, an approach with a Bayesian Network (not a BNN) was considered, however, the method failed to converge due to the high dimension of data and sparsity.

Feature Importance and Interpretation. One goal of the disclosed embodiments is to understand which features of the attack (TTP) are considered as important by to make a prediction whether attack is ransomware or not. Recall that the core idea behind BNN with Spike and Slab distributions is to learn a parameter $\theta_\pi$, which models the probability $S(\theta_\pi)$ of each node of the neural network to be included. Given that first layer of the Bayesian Neural Network is fully connected, $S(\theta_\pi)$ of the first layer is considered as an importance of each TTP for the network. Since not all TTP are equally important, spikes in learned $S(\theta_\pi)$, and this is indeed what was found.

Figure 7:
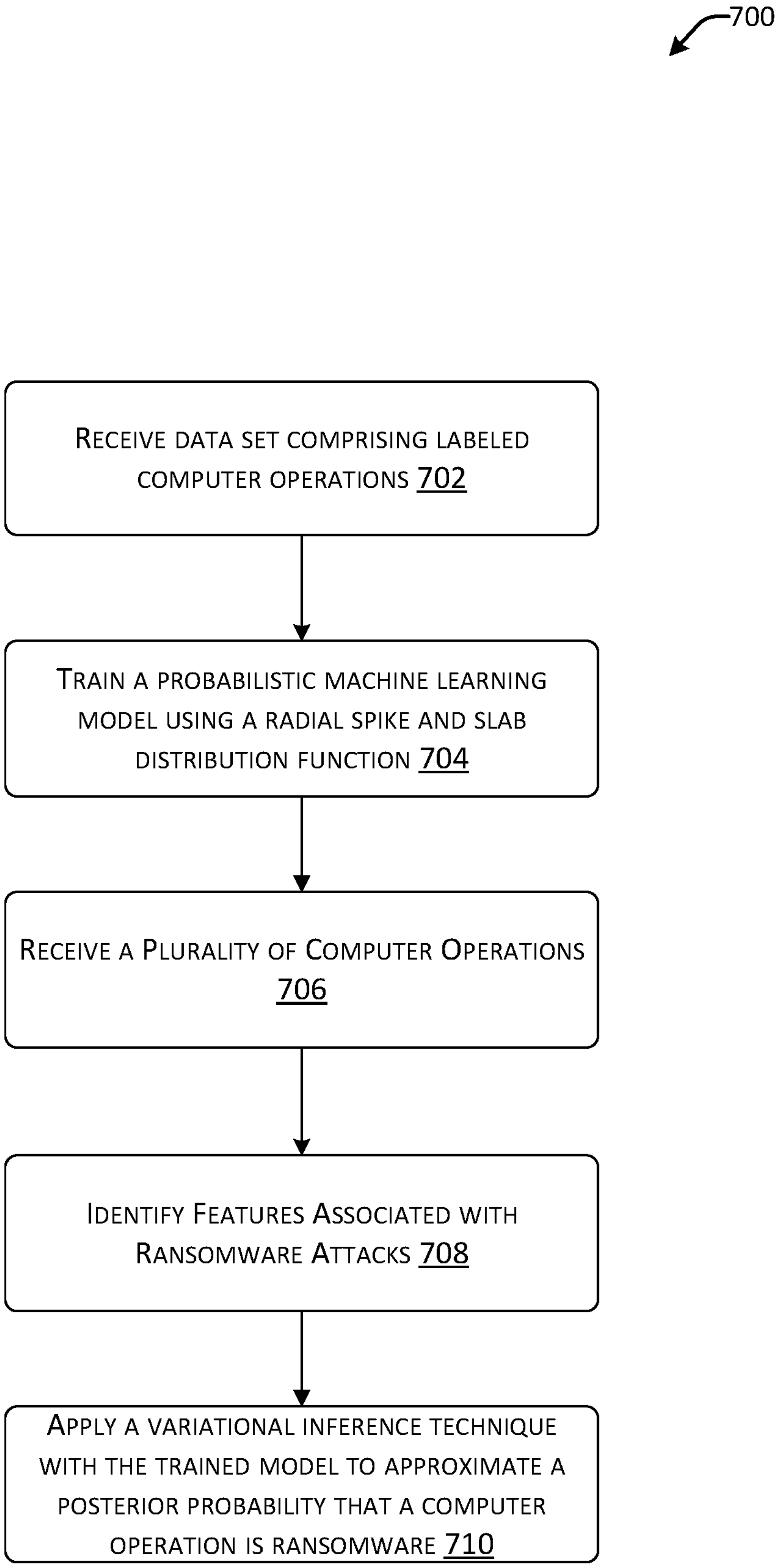
FIG. 7 is a flow diagram of an example method for analyzing command line strings to detect malicious inputs.

Turning now to FIG. 7, aspects of a routine for enabling a system 100 to learn and detect ransomware is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 7, routine 700 begins at operation 702 where the system receives a data set comprising labeled computer operations Next at operation 704, the system trains a probabilistic machine learning model in which each weight is sampled from a Radial Spike and Slab distribution function. In some configurations the Radial Spike and Slab distribution function aggregates a Slab distribution function with a defined probability and a Spike distribution with a probability of (1−the defined probability). Training the probabilistic machine learning model may include learning the defined probability.

In some configurations, a variational approximation technique is used to train the model. Specifically, the parameters of an approximate posterior probability distribution is learned. In some configurations, the variational inference technique is based on two components: the prior probability and the approximate posterior probability. A distribution is identified for the prior probability. The prior probability may be stable, and not learned. However, the distribution for the approximate posterior is learned. In some configurations, the Slab of the prior distribution may be Gaussian, while for the approximate posterior the Slab is considered Radial.

Next at operation 706, a plurality of computer operations 102 are received. In some configurations, these computer operations are received in real-time while monitoring a computing device for ransomware attacks.

Next at operation 708, features associated with ransomware attacks are identified from within the plurality of computer-operations 102.

Proceeding to operation 710, a variational inference technique is applied with the trained probabilistic machine learning model to approximate a posterior probability of an individual computer operation being associated with ransomware.

Figure 8:
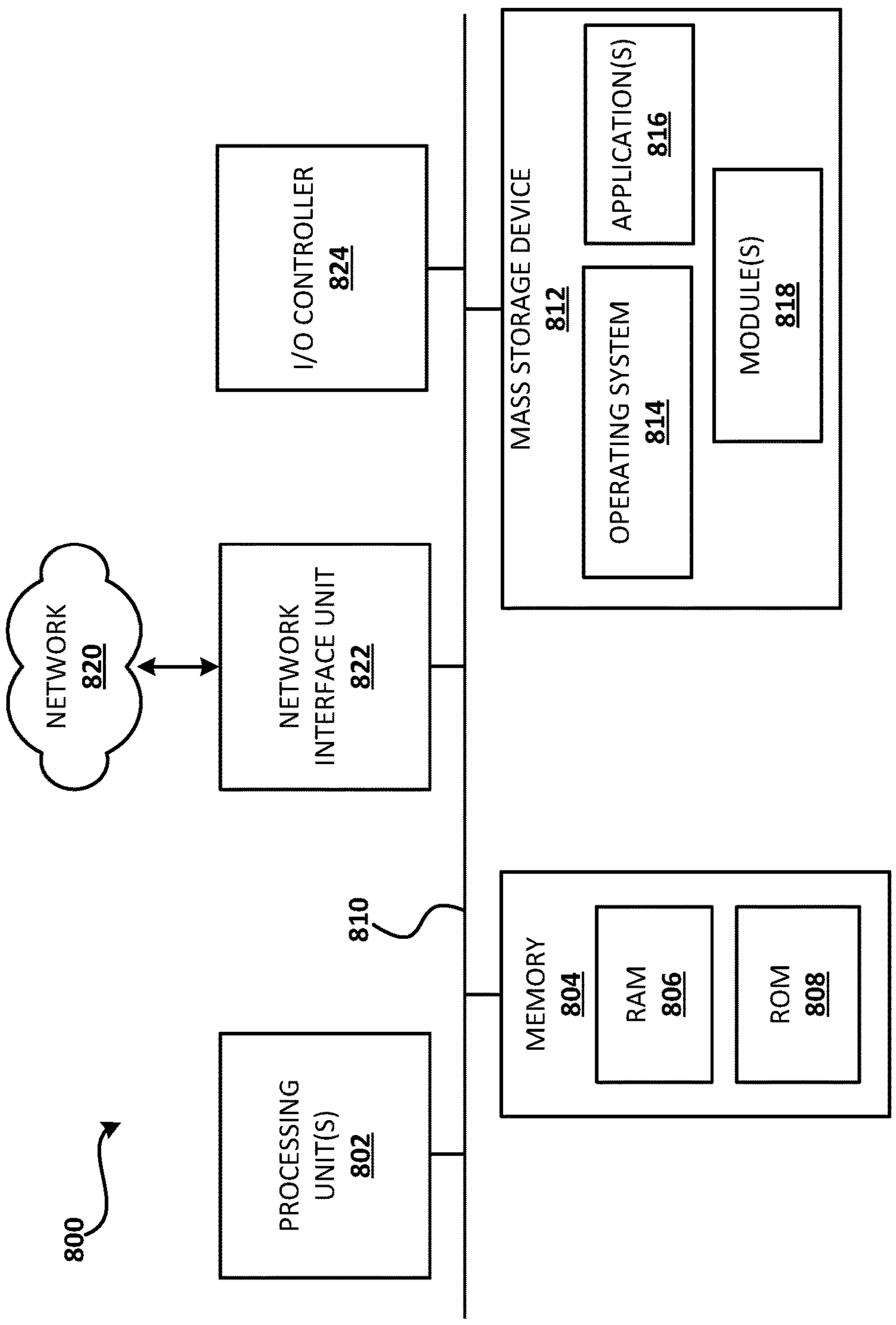
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a device, such as a computer or a server configured as part of the system 100, capable of executing computer instructions (e.g., a module or a program component described herein). The computer architecture 800 illustrated in FIG. 8 includes processing unit(s) 802, a system memory 804, including a random-access memory 806 ("RAM") and a read-only memory ("ROM") 808, and a system bus 810 that couples the memory 804 to the processing unit(s) 802.

Processing unit(s), such as processing unit(s) 802, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 800, such as during startup, is stored in the ROM 808. The computer architecture 800 further includes a mass storage device 812 for storing an operating system 814, application(s) 816, modules 818, and other data described herein.

The mass storage device 812 is connected to processing unit(s) 802 through a mass storage controller connected to the bus 810. The mass storage device 812 and its associated computer-readable media provide non-volatile storage for the computer architecture 800. Although the description of computer-readable media contained herein refers to a mass storage device, it should be appreciated by those skilled in the art that computer-readable media can be any available computer-readable storage media or communication media that can be accessed by the computer architecture 800.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 800 may operate in a networked environment using logical connections to remote computers through the network 820. The computer architecture 800 may connect to the network 820 through a network interface unit 822 connected to the bus 810. The computer architecture 800 also may include an input/output controller 824 for receiving and processing input from a number of other devices, including a keyboard, mouse, touch, or electronic stylus or pen. Similarly, the input/output controller 824 may provide output to a display screen, a printer, or other type of output device.

It should be appreciated that the software components described herein may, when loaded into the processing unit(s) 802 and executed, transform the processing unit(s) 802 and the overall computer architecture 800 from a general-purpose computing system into a special-purpose computing system customized to facilitate the functionality presented herein. The processing unit(s) 802 may be constructed from any number of transistors or other discrete circuit elements, which may individually or collectively assume any number of states. More specifically, the processing unit(s) 802 may operate as a finite-state machine, in response to executable instructions contained within the software modules disclosed herein. These computer-executable instructions may transform the processing unit(s) 802 by specifying how the processing unit(s) 802 transition between states, thereby transforming the transistors or other discrete hardware elements constituting the processing unit (s) 802.

Figure 9:
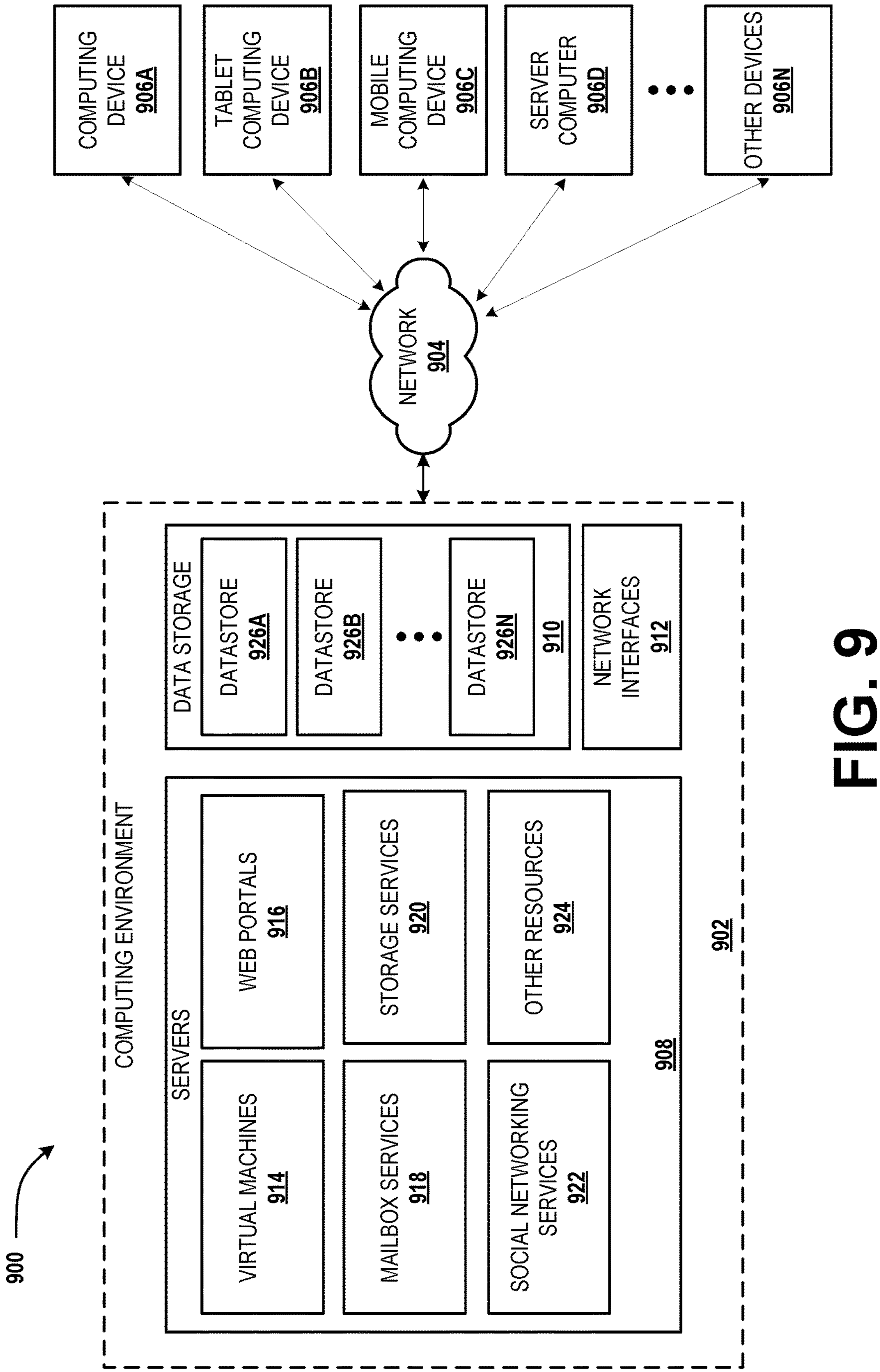
FIG. 9 is a diagram illustrating a distributed computing environment capable of implementing aspects of the techniques and technologies presented herein.

FIG. 9 depicts an illustrative distributed computing environment 900 capable of executing the software components described herein. Thus, the distributed computing environment 900 illustrated in FIG. 9 can be utilized to execute any aspects of the software components presented herein. For example, the distributed computing environment 900 can be utilized to execute aspects of the software components described herein.

Accordingly, the distributed computing environment 900 can include a computing environment 902 operating on, in communication with, or as part of the network 904. The network 904 can include various access networks. One or more client devices 906A-906N (hereinafter referred to collectively and/or generically as "clients 906" and also referred to herein as computing devices 906) can communicate with the computing environment 902 via the network 904. In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902.

In various examples, the computing environment 902 includes servers 908, data storage 910, and one or more network interfaces 912. The servers 908 can host various services, virtual machines, portals, and/or other resources. In the illustrated configuration, the servers 908 host virtual machines 914, Web portals 916, mailbox services 918, storage services 920, and/or, social networking services 922. As shown in FIG. 9 the servers 908 also can host other services, applications, portals, and/or other resources ("other resources") 924.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more servers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the servers 708 and/or other data. That is, the datastores 926 also can host or store web page documents, word documents, presentation documents, data structures, algorithms for execution by a recommendation engine, and/or other data utilized by any application program. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the computing devices and the servers. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing the techniques disclosed herein, among other aspects.

The present disclosure is supplemented by the following example clauses.

Example 1: A method comprising: receiving a data set (130) comprising records of a first plurality of computer operations that have been labeled as being caused by ransomware (210) or not being caused by ransomware; using the received data set to train a probabilistic machine learning model (108) with posterior Spike and Slab distributions (334), wherein an individual posterior Spike and Slab distribution (334) is an aggregation of a slab distribution function (508) and a spike distribution function (506), wherein the individual posterior Spike and Slab distribution has a first probability (522) of being sampled from the slab distribution (508) and a second probability (520) of being sampled from the spike distribution (506), and wherein training the Spike and Slab probabilistic machine learning model includes learning the first probability (522) and the second probability (520) by sampling values from a prior Spike and Slab distribution function of the machine learning model; receiving a second plurality of computer operations (102) that occurred over a defined period of time (104); identifying features (604B) associated with ransomware attacks from the second plurality of computer operations; applying the trained probabilistic machine learning model (108) to infer a probability that at least some of the second plurality of computer operations (102) were caused by ransomware (110); and applying a security countermeasure to disable a potential ransomware attack associated with the second plurality of computer operations (102).

Example 2: The method of Clause 1, further comprising: generating an aggregate feature by aggregating one of the first plurality of computing operations over a defined period of time; and utilizing the aggregate feature while training the machine learning model.

Example 3: The method of Clause 2, further comprising, wherein identifying features associated with ransomware attacks from the second plurality of computer operations comprises computing aggregate features from the second plurality of computer operations over a sliding window of time.

Example 4: The method of Clause 3, wherein the sliding window of time is greater than the defined period of time.

Example 5: The method of Clause 2, wherein the one of the first plurality of computing operations is aggregated over the defined period of time by counting a number of instances within the defined period of time.

Example 6: The method of Clause 2, wherein the one of the first plurality of computing operations is aggregated over the defined period of time by maintaining a run rate of the one of the first plurality of computing operations.

Example 7: The method of Clause 1, wherein the first plurality of computer operations have been labeled as being caused by ransomware, non-ransomware malware, or benign activity.

Example 8: A computer-readable storage medium having computer-executable instructions stored thereupon which, when executed by a processing device, cause the processing device to: receive a data set (130) comprising records of a first plurality of computer operations that have been labeled as being caused by ransomware (210) or being caused by malware that is not ransomware; using the received data set to train a probabilistic machine learning model (108) with posterior Spike and Slab distributions (334), wherein an individual posterior Spike and Slab distribution (334) is an aggregation of a Slab distribution function (508) and a Spike distribution function (506); receive a second plurality of computer operations (102) that occurred over a defined period of time (104); identify features (604B) associated with ransomware attacks from the second plurality of computer operations (102); apply the trained probabilistic machine learning model (108) to infer a probability that at least some of the second plurality of computer operations (102) were caused by ransomware (110); and apply a security countermeasure to disable a potential ransomware attack associated with the second plurality of computer operations (102).

Example 9: The computer-readable storage medium of Clause 8, wherein the individual posterior Spike and Slab distribution has a first probability of being sampled from the slab distribution and a second probability of being sampled from the spike distribution, and wherein training the Spike and Slab machine learning model includes learning the first probability and the second probability.

Example 10: The computer-readable storage medium of Clause 9, wherein the individual posterior Spike and Slab distribution is trained by sampling values from a prior Spike and Slab distribution function of the machine learning model that does not incorporate observed data derived from the first plurality of computer operations.

Example 11: The computer-readable storage medium of Clause 9, wherein the first probability equals one minus the second probability.

Example 12: The computer-readable storage medium of Clause 9, wherein the first plurality of computer operations includes records of computer operations that were performed over time during a ransomware attack and records of computer operations that were performed over time during a non-ransomware malware attack.

Example 13: The computer-readable storage medium of Clause 8, wherein the probabilistic machine learning model comprises a Bayesian neural network that samples weights for individual nodes from individual posterior Spike and Slab distributions, wherein each individual posterior Spike and Slab distribution has individual probabilities learned during model training for selecting a value from a spike component or a slab component.

Example 14: The computer-readable storage medium of Clause 8, wherein repeatedly performing an inference using the trained probabilistic machine learning model yields a distribution of output values.

Example 15: A computing device, comprising: a computer-readable storage medium having computer-executable instructions stored thereupon; and a processor that executes the computer-executable instructions, causing the computing device to: receive a data set (130) comprising records of a first plurality of computer operations that have been labeled as being caused by ransomware (210) or being caused by malware that is not ransomware; using the received data set to train a Bayesian neural network-based machine learning model (108) with posterior radial Spike and Slab distributions (334), wherein an individual posterior radial Spike and Slab distribution (334) is an aggregation of a slab distribution function (508) and a spike distribution function (506), and wherein the probabilistic machine learning model generates weights by sampling from the posterior Spike and Slab distributions (334); receive a second plurality of computer operations (102) that occurred over a defined period of time (104); identify features (604B) associated with ransomware attacks from the second plurality of computer operations (102); apply the trained probabilistic machine learning model (108) to infer a probability that at least some of the second plurality of computer operations (102) were caused by ransomware (110); and apply a security countermeasure to disable a potential ransomware attack associated with the second plurality of computer operations (102).

Example 16: The computing device of Clause 15, wherein the probability of a ransomware attack given an individual feature has been observed is equal to the integral over the weights of the machine learning model of: a probability of a ransomware attack given the probability of the weight and given that the individual feature has been observed multiplied by the probability of the weight given that the individual feature has been observed.

Example 17: The computing device of Clause 15, wherein the probability of a ransomware attack given an individual feature has been observed is equal to: $p(y|x)=\int_w p(y,W|x)dW=\int_W p(y|W,x)p(W|x)dW$.

Example 18: The computing device of Clause 17, wherein the first plurality of computing operations occurred over a first amount of time, wherein a second probabilistic machine learning model is trained based on a third plurality of computing operations that have been labeled as being caused by ransomware or not being caused by ransomware, and wherein the third plurality of computing operations occurred over a second amount of time that is different than the first amount of time.

Example 19: The computing device of Clause 15, wherein individual posterior probabilities of nodes of the probabilistic machine learning model are computed using variable inference.

Example 20: The computing device of Clause 19, wherein the individual posterior probabilities are computed using an approximating distribution $Q_\theta$, where $\theta$ is learned when training the probabilistic machine learning model.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to “first,” “second,” etc. elements within the Summary and/or Detailed Description is not intended to and should not be construed to necessarily correspond to any reference of “first,” “second,” etc. elements of the claims. Rather, any use of “first” and “second” within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:

receiving a data set comprising records of a first plurality of computer operations that have been labeled as being caused by ransomware or not being caused by ransomware;

training a probabilistic machine learning model with posterior Spike and Slab distributions using the received data set, wherein an individual posterior Spike and Slab distribution is an aggregation of a slab distribution function and a spike distribution function, wherein the individual posterior Spike and Slab distribution has a first probability of being sampled from the slab distribution and a second probability of being sampled from the spike distribution, and wherein training the probabilistic machine learning model includes learning the first probability and the second probability by sampling values from a prior Spike and Slab distribution function and updating the first probability and the second probability based on how well the probabilistic machine learning model explains labeled records of the data set when evaluated using the sampled values;

receiving a second plurality of computer operations that were performed in part by a computing device over a defined period of time;

identifying features associated with ransomware attacks from the second plurality of computer operations;

applying the trained probabilistic machine learning model to infer that at least some of the second plurality of computer operations were caused by ransomware; and applying a security countermeasure to the computing device to disable a potential ransomware attack associated with the second plurality of computer operations.

2. The method of claim 1, further comprising:

generating an aggregate feature by aggregating one of the first plurality of computing operations over a defined period of time; and utilizing the aggregate feature while training the machine learning model.

3. The method of claim 2, further comprising, wherein identifying features associated with ransomware attacks from the second plurality of computer operations comprises computing aggregate features from the second plurality of computer operations over a sliding window of time.

4. The method of claim 3, wherein the sliding window of time is greater than the defined period of time.

5. The method of claim 2, wherein the one of the first plurality of computing operations is aggregated over the defined period of time by counting a number of instances within the defined period of time or by maintaining a run rate of the one of the first plurality of computing operations.

6. The method of claim 1, wherein the security countermeasure stops, delays, or rolls back the potential ransomware attack.

7. The method of claim 1, wherein the probabilistic machine learning model comprises a neural network, and wherein weights of the neural network are sampled from the spike and slab distributions.

8. A computer-readable storage medium having computer-executable instructions stored thereupon which, when executed by a processing device, cause the processing device to:

receive a data set comprising records of a first plurality of computer operations that have been labeled as being caused by ransomware or being caused by malware that is not ransomware;

train a probabilistic machine learning model with posterior Spike and Slab distributions using the received data set, wherein an individual posterior Spike and Slab distribution is an aggregation of a Slab distribution function and a Spike distribution function, wherein the individual posterior Spike and Slab distribution has a first probability of being sampled from the slab distribution and a second probability of being sampled from the spike distribution, and wherein training the probabilistic machine learning model includes learning the first probability and the second probability by sampling values from a prior Spike and Slab distribution function and updating the first probability and the second probability based on how well the probabilistic machine learning model explains labeled records of the data set when evaluated using the sampled values;

receive a second plurality of computer operations that were performed in part by a computing device over a defined period of time;

identify features associated with ransomware attacks from the second plurality of computer operations;

apply the trained probabilistic machine learning model to infer that at least some of the second plurality of computer operations were caused by ransomware; and apply a security countermeasure to the computing device to disable a potential ransomware attack associated with the second plurality of computer operations.

9. The computer-readable storage medium of claim 8, wherein the individual posterior Spike and Slab distribution is trained by sampling values from a prior Spike and Slab distribution function of the machine learning model that does not incorporate observed data derived from the first plurality of computer operations.

10. The computer-readable storage medium of claim 8, wherein the first probability equals one minus the second probability.

11. The computer-readable storage medium of claim 8, wherein the first plurality of computer operations includes records of computer operations that were performed over time during a ransomware attack and records of computer operations that were performed over time during a non-ransomware malware attack.

12. The computer-readable storage medium of claim 8, wherein the probabilistic machine learning model comprises a Bayesian neural network that samples weights for individual nodes from individual posterior Spike and Slab distributions, wherein each individual posterior Spike and Slab distribution has individual probabilities learned during model training for selecting a value from a spike component or a slab component.

13. The computer-readable storage medium of claim 8, wherein repeatedly performing an inference using the trained probabilistic machine learning model yields a distribution of output values.

14. A computing device, comprising:

a computer-readable storage medium having computer-executable instructions stored thereupon; and a processor that executes the computer-executable instructions, causing the computing device to:

receive a data set comprising records of a first plurality of computer operations that have been labeled as being caused by ransomware or being caused by malware that is not ransomware;

train a Bayesian neural network-based machine learning model with posterior radial Spike and Slab distributions using the received data set, wherein an individual posterior radial Spike and Slab distribution is an aggregation of a slab distribution function and a spike distribution function, wherein the probabilistic machine learning model generates weights by sampling from the posterior Spike and Slab distributions, wherein the individual posterior Spike and Slab distribution has a first probability of being sampled from the slab distribution and a second probability of being sampled from the spike distribution, and wherein training the machine learning model includes learning the first probability and the second probability by sampling values from a prior Spike and Slab distribution function and updating the first probability and the second probability based on how well the probabilistic machine learning model explains labeled records of the data set when evaluated using the sampled values;

receive a second plurality of computer operations that occurred over a defined period of time;

identify features associated with ransomware attacks from the second plurality of computer operations;

apply the trained probabilistic machine learning model to infer a probability that at least some of the second plurality of computer operations were caused by ransomware; and apply a security countermeasure to disable a potential ransomware attack associated with the second plurality of computer operations.

15. The computing device of claim 14, wherein the probability of a ransomware attack given an individual feature has been observed is equal to the integral over the weights of the machine learning model of:

a probability of a ransomware attack given the probability of the weight and given that the individual feature has been observed multiplied by the probability of the weight given that the individual feature has been observed.

16. The computing device of claim 14, wherein the probability of a ransomware attack given an individual feature has been observed is equal to: $p(y|x)=\int_w p(y, W|x)\,dW=\int_W p(y|W,x)p(W|x)dW$.

17. The computing device of claim 16, wherein the first plurality of computing operations occurred over a first amount of time, wherein a second probabilistic machine learning model is trained based on a third plurality of computing operations that have been labeled as being caused by ransomware or not being caused by ransomware, and wherein the third plurality of computing operations occurred over a second amount of time that is different than the first amount of time.

18. The computing device of claim 14, wherein individual posterior probabilities of nodes of the probabilistic machine learning model are computed using variable inference.

19. The computing device of claim 18, wherein the individual posterior probabilities are computed using an approximating distribution $Q_\theta$, where $\theta$ is learned when training the probabilistic machine learning model.

* * * * *